United States Patent
Hildreth et al.

(10) Patent No.: US 9,156,013 B2
(45) Date of Patent: Oct. 13, 2015

(54) SOLUTION MAKING SYSTEM AND METHOD

(71) Applicant: Cargill, Incorporated, Wayzata, MN (US)

(72) Inventors: Clay Hildreth, Fishers, IN (US); Michael Hoerle, Eden Prairie, MN (US); Scott Aksamit, Edina, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 13/652,973

(22) Filed: Oct. 16, 2012

(65) Prior Publication Data

US 2013/0094324 A1 Apr. 18, 2013

Related U.S. Application Data

(60) Division of application No. 11/996,443, filed as application No. PCT/US2006/028951 on Jul. 27, 2006, now abandoned, which is a continuation-in-part of application No. 11/190,395, filed on Jul. 27, 2005, now Pat. No. 7,810,987.

(51) Int. Cl.
*B01F 15/02* (2006.01)
*B01F 15/00* (2006.01)
*B01F 1/00* (2006.01)
*B01F 5/10* (2006.01)
*E01H 10/00* (2006.01)
*G05D 11/13* (2006.01)

(52) U.S. Cl.
CPC ........... *B01F 15/0022* (2013.01); *B01F 1/0016* (2013.01); *B01F 1/0038* (2013.01); *B01F 5/106* (2013.01); *B01F 15/00032* (2013.01); *B01F 15/00155* (2013.01); *B01F 15/00207* (2013.01); *B01F 15/00285* (2013.01); *B01F 15/00305* (2013.01); *E01H 10/00* (2013.01); *G05D 11/135* (2013.01); *B01F 15/00844* (2013.01)

(58) Field of Classification Search
CPC .................... B01F 15/00155; B01F 15/00207; B01F 15/0022; B01F 15/00285; G05D 11/135
USPC .................... 366/189, 156.2, 152.4, 136, 137
See application file for complete search history.

(56) References Cited

U.S. PATENT DOCUMENTS 3,595,438 A   7/1971   Daley et al.
4,026,801 A   5/1977   Ward
(Continued)

FOREIGN PATENT DOCUMENTS

EP   0443741 A   8/1991
FR   2517984 A   6/1983
(Continued)

OTHER PUBLICATIONS

International Search Report and Written Opinion of PCT/US006/028951, mailed Feb. 19, 2007.
(Continued)

*Primary Examiner* — Tony G Soohoo

(57) ABSTRACT

A solution making system and apparatus are described. The solution maker mixes a chemical or slurry with a solvent to a desired concentration. The concentration of the solution is monitored by one or more methods. Based upon this measurement, the concentration of the solution may be adjusted.

10 Claims, 28 Drawing Sheets

(56) References Cited

U.S. PATENT DOCUMENTS

| | | | |
|---|---|---|---|
| 4,247,298 A | 1/1981 | Rippie et al. | |
| 4,784,495 A * | 11/1988 | Jonsson et al. | 366/151.1 |
| 4,863,277 A * | 9/1989 | Neal et al. | 366/137 |
| 4,976,377 A | 12/1990 | Higuchi et al. | |
| 5,137,694 A | 8/1992 | Copeland et al. | |
| 5,169,406 A | 12/1992 | Tewari | |
| 5,344,231 A * | 9/1994 | Jonsson et al. | 366/137 |
| 5,460,446 A * | 10/1995 | Chevallet et al. | 366/132 |
| 5,476,320 A * | 12/1995 | Taguchi et al. | 366/152.1 |
| 5,522,660 A * | 6/1996 | O'Dougherty et al. | 366/136 |
| 5,590,960 A | 1/1997 | Clinton et al. | |
| 5,647,391 A * | 7/1997 | Chan et al. | 137/93 |
| 5,800,056 A | 9/1998 | Suzuki et al. | |
| 5,800,506 A * | 9/1998 | Perouse | 623/1.1 |
| 5,819,776 A | 10/1998 | Kephart | |
| 5,874,049 A | 2/1999 | Ferri, Jr. et al. | |
| 5,980,836 A * | 11/1999 | Moffett et al. | 422/129 |
| 5,992,437 A | 11/1999 | Takasaki et al. | |
| 6,048,391 A | 4/2000 | De Valk et al. | |
| 6,331,255 B1 | 12/2001 | Peddicord | |
| 6,439,252 B1 | 8/2002 | Kephart | |
| 6,446,879 B1 | 9/2002 | Kime | |
| 6,451,270 B1 | 9/2002 | Killian et al. | |
| 6,468,481 B1 | 10/2002 | Anderson | |
| 6,736,153 B1 | 5/2004 | Kime | |
| 6,845,298 B2 | 1/2005 | Nelson et al. | |
| 6,966,688 B2 | 11/2005 | Lins | |
| 7,186,390 B1 | 3/2007 | Hellbusch et al. | |
| 7,363,114 B2 | 4/2008 | Anderson et al. | |
| 7,803,335 B1 | 9/2010 | Cope | |
| 7,810,987 B2 | 10/2010 | Hildreth | |
| 8,251,569 B2 | 8/2012 | Hildreth | |
| 2004/0052164 A1 * | 3/2004 | Smith et al. | 369/13.05 |
| 2004/0057334 A1 * | 3/2004 | Wilmer et al. | 366/136 |
| 2013/0094324 A1 * | 4/2013 | Hildreth et al. | 366/152.4 |
| 2013/0099155 A1 | 4/2013 | Nesheim et al. | |

FOREIGN PATENT DOCUMENTS

| | | |
|---|---|---|
| JP | 60058231 A | 4/1985 |
| JP | 5027351 | 2/1993 |
| JP | 8071389 | 3/1996 |
| JP | 9033538 A | 2/1997 |
| JP | 10296257 A | 11/1998 |
| JP | 2000508959 A | 7/2000 |
| JP | 2001232162 A | 8/2001 |
| JP | 2001264277 A | 9/2001 |
| JP | 2005-118705 | 5/2005 |
| WO | WO 2007/016135 | 2/2007 |

OTHER PUBLICATIONS

Partial International Search Report of PCT/US2006/028951 mailed Dec. 4, 2006.

International Preliminary Report on Patentability of PCT/US2006/028951 mailed Jan. 29, 2008.

Extended European Search Report of European Patent Application No. 08019200.8 mailed Feb. 5, 2009.

Extended European Search Report of European Patent Application No. 08019201.6 mailed Feb. 5, 2009.

Professional Salt Brine Making, Blending & Truck Loading Solution, BrineXtreme, Retrieved online: http://www.henderson-mfg.com/brinextreme.html#brinextreme__ultimate__mobile, Feb. 2013.

* cited by examiner

SOLUTION MAKING SYSTEM AND METHOD

CROSS REFERENCE TO RELATED APPLICATION

This application is a Divisional of U.S. patent application Ser. No. 11/996,443, filed Oct. 1, 2008, entitled SOLUTION MAKING SYSTEM AND METHOD, which is a '371 of PCT Patent Application, Serial No. PCT/US2006/028951, filed Jul. 27, 2006, entitled SOLUTION MAKING SYSTEM AND METHOD, which is a Continuation-in-Part of U.S. patent application Ser. No. 11/190,395, filed Jul. 27, 2005, entitled SOLUTION MAKING SYSTEM AND METHOD, which are hereby incorporated by reference in their entirety.

TECHNICAL FIELD

Aspects of the present invention relate to an apparatus and method and control system used to produce chemical solutions (for instance, a brine solution). More specifically, aspects of the invention relate to an apparatus for dissolving a chemical in a solvent to produce a solution of a specific concentration.

BACKGROUND

Chemicals dissolved in a solvent at a specific concentration are used in a myriad of industries. For example, the application of a salt solution to reduce the amount of snow and ice from roads, sidewalks, driveways and other surfaces is a common industrial practice. Salt solution is generally created by mixing rock salt and water to produce a solution. The concentration of the solution may then be adjusted by adding fresh water to dilute the mixture or adding salt to concentrate the mixture. A solution of approximately 23-27% by weight is efficient for removing ice and snow (where sodium chloride is at least one of the salts). At this concentration range, the solution will melt ice and snow with an ambient temperature of approximately −10 degrees Fahrenheit. If the desired concentration is not maintained in the solution and applied in the correct amounts on the streets, accidents may occur. For instance, too little salt in the mixture may not lower the freezing point of water below the ambient conditions, resulting in a mixture that can promote icing of roadways as compared to melting previously accumulated ice.

One method of monitoring and adjusting the concentration of a solution is to measure the specific gravity of the solution and add a solvent (fresh water in the case of some salts) to the solution until a desired specific gravity is met. This method thus correlates the specific gravity of the solution with the concentration of the solution. At least one conventional system provides for producing large quantities of dissolved rock salt or calcium magnesium acetate (CMA) pellets in water for producing a salt solution to be used as a liquid deicer to be used for spraying roadways, sidewalks, driveways, and runways to melt snow and ice. An electronic hydrometer (a specific gravity measuring device) measures the specific gravity of the brine/water solution. If the specific gravity is too high or too low a valve is opened or closed to adjust the amount of fresh water to the mixture. In this manner the mixture is adjusted to the salinity desired.

As mentioned above, methods for producing salt solutions that use specific gravity as an indicator of concentration correlate specific gravity to concentration. This correlation can, in some instances, be faulty. For example, solids such as silica, dirt, and other foreign material in the solution can affect the specific gravity of the solution and/or the reading of the measuring device. This may in turn lead to an undesired salt concentration level for the solution based on fluctuations in the mixed solution. In addition, measurements based on specific gravity generally are a series of separate measurements, spaced apart in time and process, rather than a continuous measurement during the mixing operation or operations.

Also, other mixing systems are unidirectional and do not account for fluctuations that may occur in mixing operations, thereby providing mixtures that are too low or too high in concentration.

Therefore, there is a need in the art for an apparatus and method that produces an accurate concentration level for a mixture.

BRIEF SUMMARY

This summary is provided to introduce a selection of concepts in a simplified form that are further described below in the Detailed Description. This summary is not intended to identify key features or essential features of the claimed subject matter.

This application discloses an improved system and method for combining compounds and/or additives. The system and method described is able to produce a solution with a desired concentration of chemicals. Alternatively, it could produce a solution with at least a certain concentration or at most a certain concentration of the chemicals. The system includes an area where the chemicals can be mixed, and a concentration sensor used to determine if the solution needs to be made more concentrated or diluted. If the concentration is within a tolerance of the target concentration, solution may be diverted to a storage tank or other vessel.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

BRIEF DESCRIPTION OF THE DRAWINGS

A more complete understanding of the present invention and the potential advantages thereof may be acquired by referring to the following description of illustrative embodiments in consideration of the accompanying drawings.

DETAILED DESCRIPTION

Figure 1:
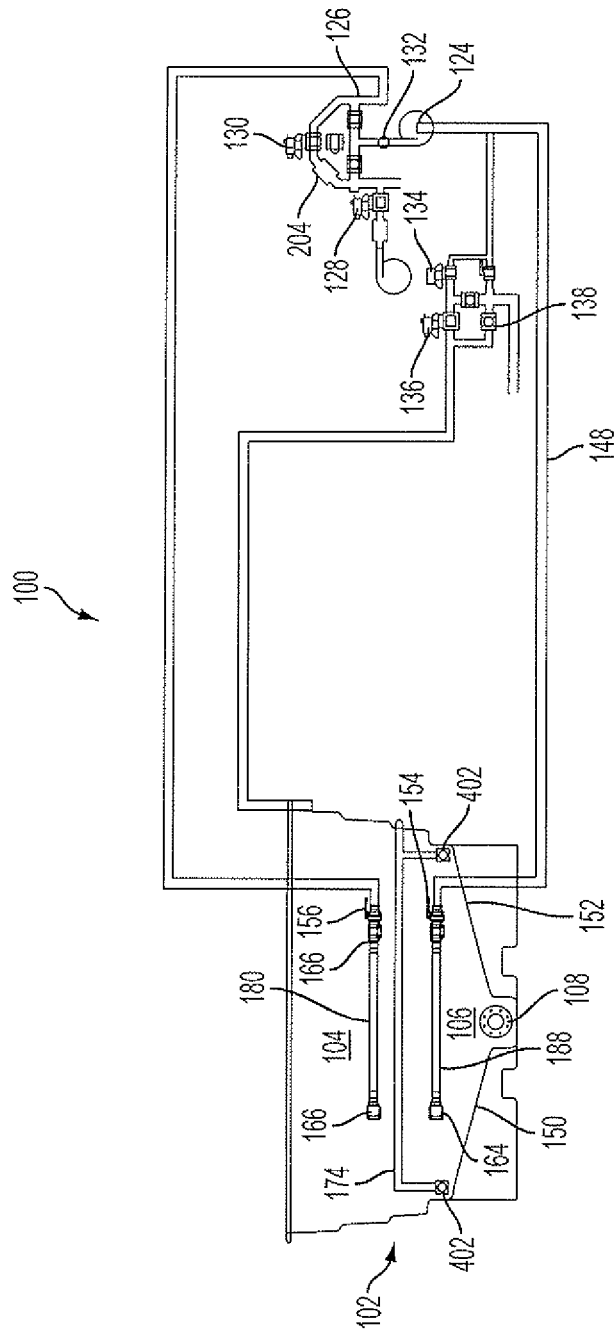
FIG. 1 illustrates a perspective view of a solution maker in accordance with one embodiment of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between elements in the following description. It is noted that these connections in general and, unless specified otherwise, may be direct or indirect and that this specification is not intended to be limiting in this respect.

This description is broken into six sections to assist the user in understanding aspects of the present invention. The sections include:
 a. Solution Maker
 b. Additives
 c. Dispensing
 d. Chemicals, Solutions, and Solvents
 e. Modifications
 f. Embodiments and Applications Solution Maker A solution maker is provided. More specifically, aspects of the present invention provide an apparatus and method of producing a solution, such as a salt solution, with a desired concentration by measuring the concentration of the solution, determining an amount of solvent to be added to the solution, and adding the amount of solvent to the solution. Throughout this application the solution, which is any combination of a solvent and a partially or wholly dissolved chemical, may also be referred to as the slurry. For instance, a highly concentrated mixture of a salt and a solvent in which less than all of the salt has been dissolved in the solvent may be referred to as a slurry for the purposes of this application. The device may further be configured to separate sediment from the chemical and solvent and flush out deposited sediments. Thus, the device may be configured for separating foreign material such as undissolved silica, dirt, and gravel from the solution.

The solution maker may operate in a manual mode where a user monitors a control panel to decide when a concentration of a solution is at a desired concentration. Alternatively, the solution maker may operate autonomously and adjust the concentration level on its own. Further, the solution maker may operate through a range of operations where some aspects are handled autonomously and others based on the direction of an operator.

In one embodiment, the solution maker may be configured for producing a clean brine solution by dissolving one or more salts (sodium chloride, for instance) into water or another solvent. In other embodiments, the solution maker may be used to dissolve other chemicals. Examples include calcium magnesium acetate, calcium chloride, magnesium chloride, potassium acetate, potassium formate, sodium formate, magnesium acetate, diamonium phosphate, monoamonium phosphate, urea, ethyl glycol, propylene glycol, and other chemicals. The solution maker may produce a solution having a concentration of a desired target concentration, a desired target concentration range, or equal to or greater than a target concentration. The solution maker can also dilute solutions or slurries that have already been produced.

Figure 2:
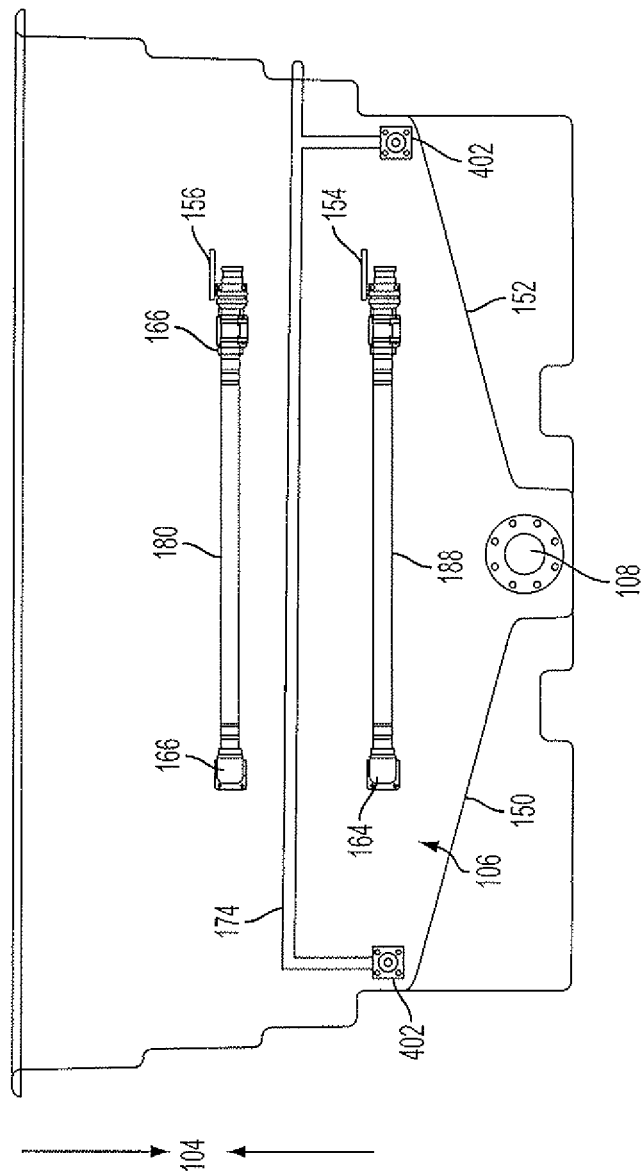
FIG. 2 illustrates a front view of a hopper of an solution maker in accordance with one embodiment of the present invention.
Figure 3:
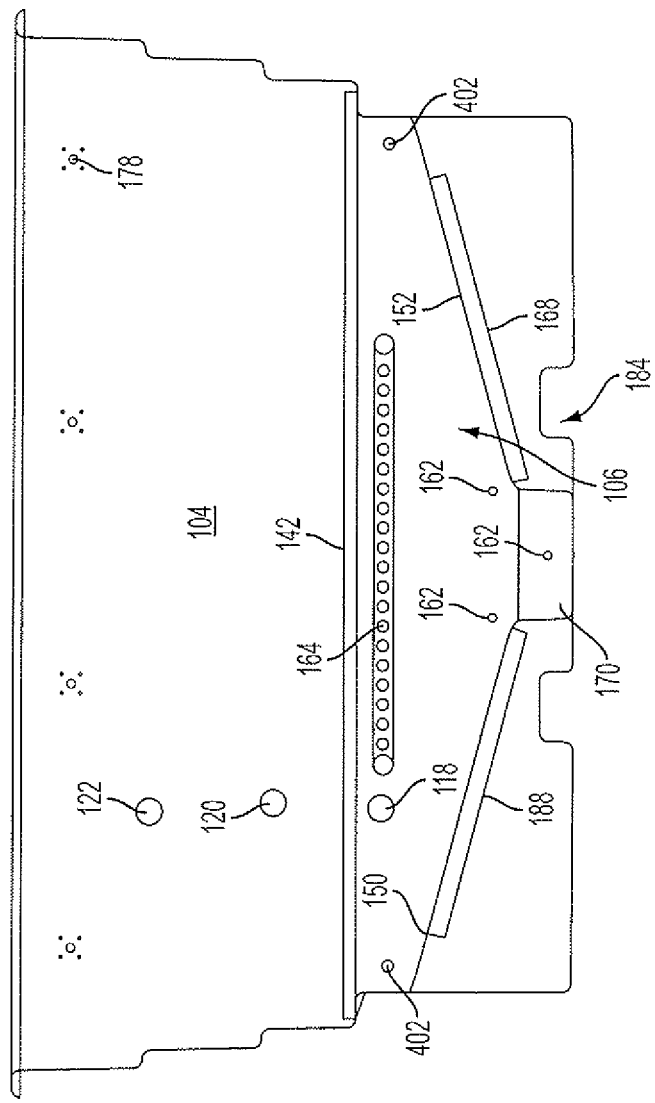
FIG. 3 illustrates a cutaway front view of a hopper of an solution maker in accordance with one embodiment of the present invention.

As shown in FIGS. 1 through 3, one aspect of an solution maker 100 may include a mixer 102 having a first container 104 and a second container 106. An example suitable capacity for the mixer 102 is five cubic yards. The first container 104 and the second container 106 are separated by a grate 142. The first container 104 is adapted to receive a chemical for dissolution in a solvent to produce a solution. To produce a brine solution, the component may be, for example, sodium chloride (NaCl or salt) or calcium magnesium sulfate. The chemical may be provided in any suitable form. For example, if the chemical is salt, it may be provided in pellet or rock form. Other components may be used to produce other solutions. As will be described more fully below, the solution maker may be calibrated for use with different chemicals or solvents to produce different solutions. In one embodiment, the solution maker mixes sodium chloride and fresh water to produce a brine solution. The chemical in the first portion may provide a chemical bed. For example, in producing a brine solution, a salt bed may be formed in the first container 104.

Figure 8:
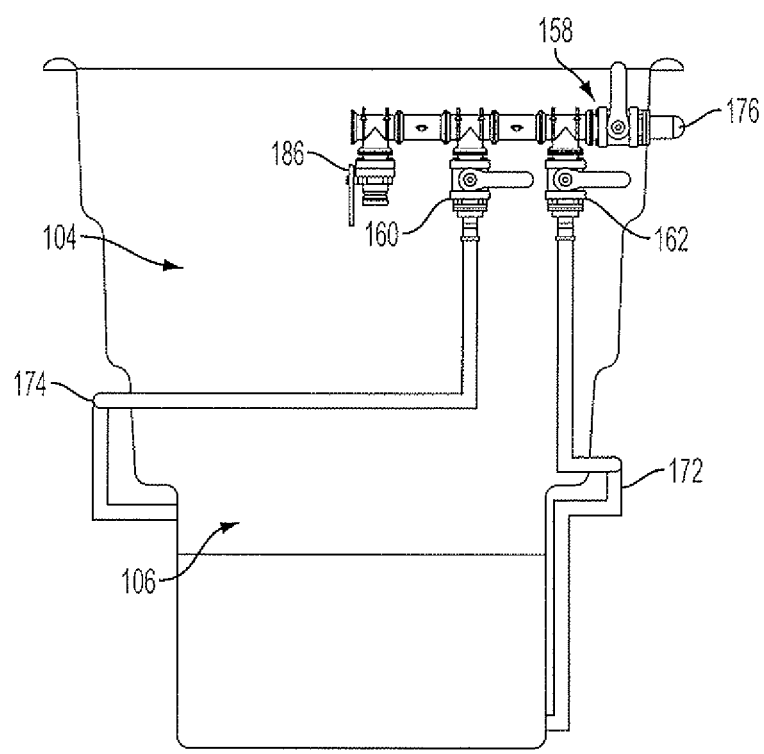
FIG. 8 illustrates an end view of a hopper of an solution maker in accordance with one embodiment of the present invention.
Figure 12:
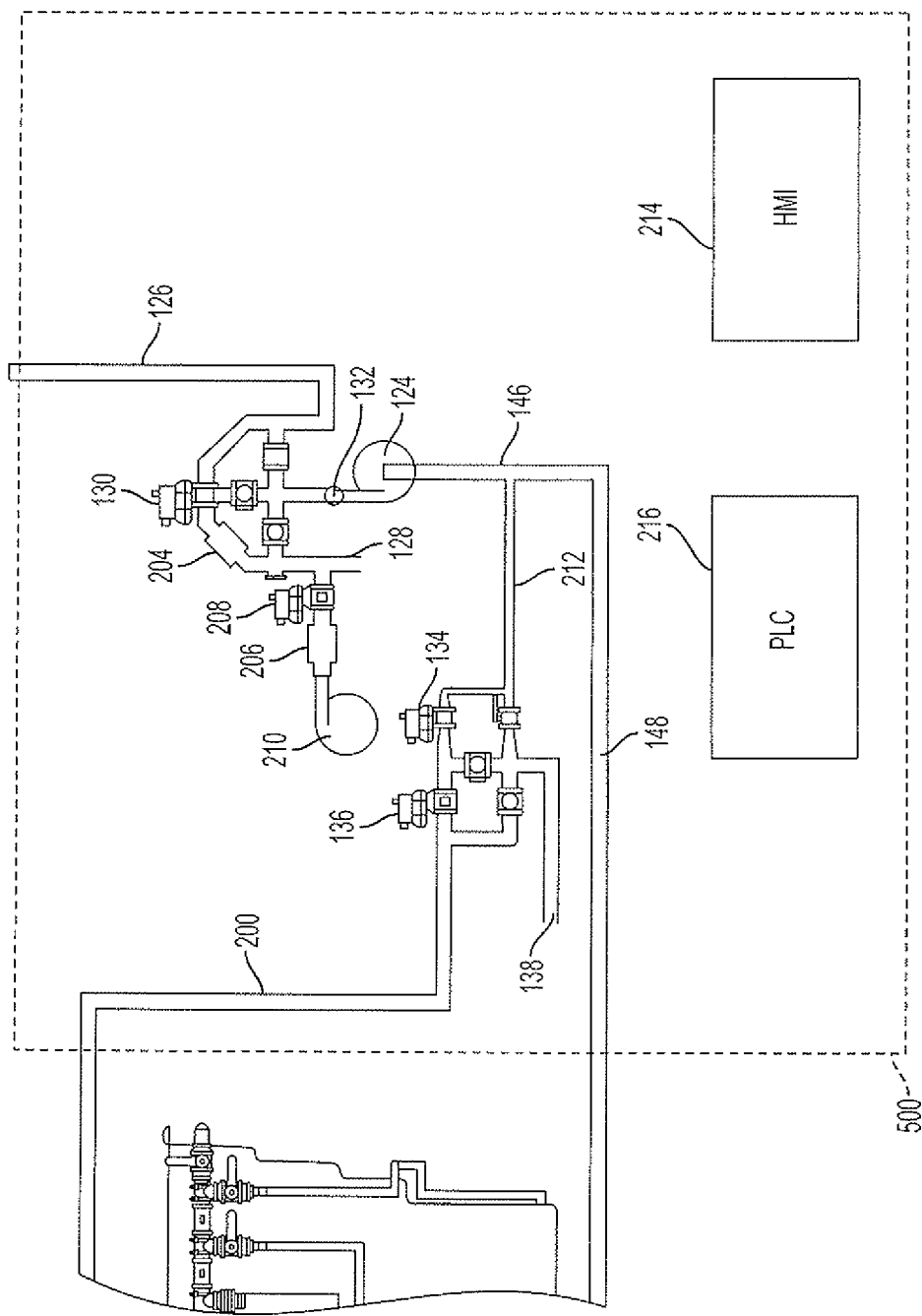
FIG. 12 illustrates a control panel and mechanical components of an solution maker in accordance with one embodiment of the present invention.
Figure 19:
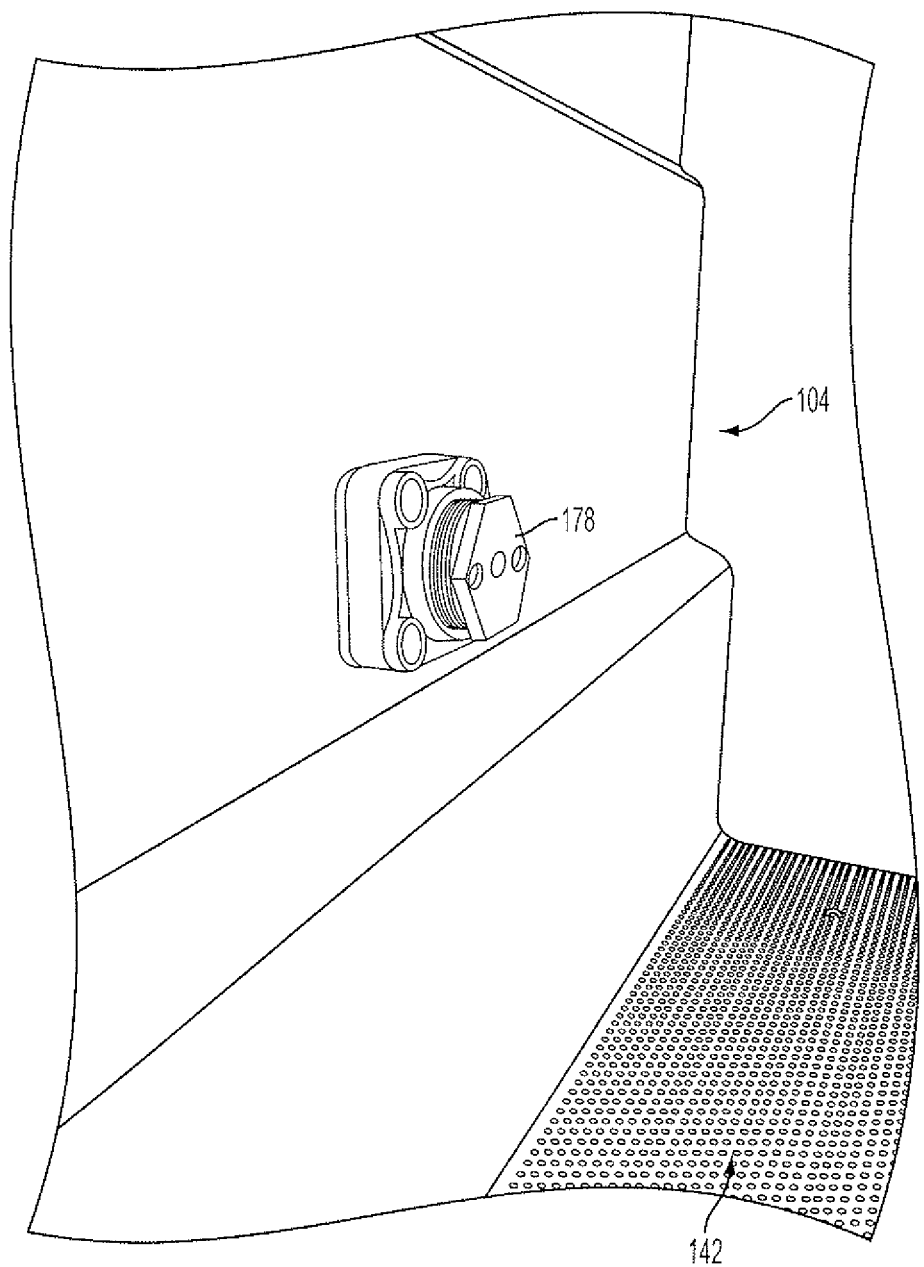
FIG. 19 illustrates an inside view of a first portion of an solution maker in accordance with one embodiment of the present invention.

The first container 104 is further adapted to receive a solvent for mixture with the chemical to produce the desired solution. The various components of the brine maker may be downward flowing and the solvent passes through the chemical bed in the first container 104 due to the force of gravity. The solvent may be delivered to the first container 104 in any suitable manner. A solvent line leading to the mixer 102 may be provided. An optional, self-regulating heating element may be coupled to the solvent line to protect against freezing of the solvent. In the embodiment of FIG. 1, the solvent is delivered via a solvent valve 136 that actuates flow from a solvent inlet 138. The solvent valve 136 may be provided as an electric actuated valve and valve actuation may be controlled by controller such as a programmable logic controller (PLC) 216 (see FIG. 12). Although many types of controllers could be used, the term PLC is used for simplicity in describing the controller in various aspects of the invention. Actuation of the valve may depend on one or more liquid level sensors and/or may be controlled by an operator or some combination of automatic operation and operator control. As described more fully below and shown in FIG. 3, a first liquid level sensor 118, a second liquid level sensor 120, and a third liquid level sensor 122 may be provided. As shown in FIGS. 8, 12, and 19, in a specific embodiment, the solvent inlet 138 may be pressurized and may supply solvent to the solution maker 100 via a solvent valve 136, conduit 200, manual valve 186, manual valve 158, conduit 176 and spray head 178 to dilute valve 134. The fresh solvent valve 136 may further include a manual override. Of course, while a specific configuration is herein described, an solution maker within the scope of the present invention may include fewer or more component parts as would be understood by one skilled in the art.

Figure 5:
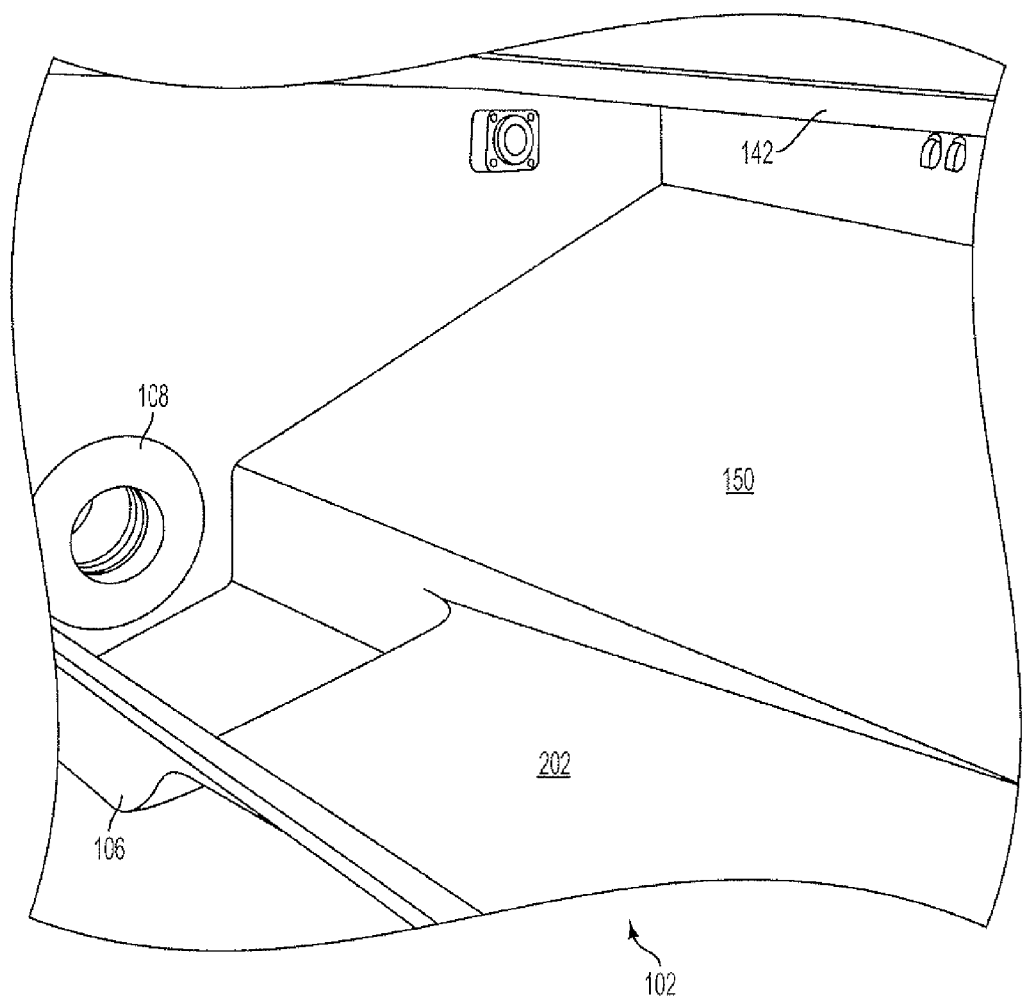
FIG. 5 illustrates an inside cutaway view of a hopper of an solution maker in accordance with one embodiment of the present invention.

A grate 142 substantially prevents the chemical from passing from the first container 104 of the mixer 102 to the second container 106 of the mixer 102 before the chemical is dissolved in the solvent. Perforations may be provided in the grate 142. When a solution comprising the solvent and dissolved chemical is formed in the first container 104, the perforations in the grate 142 allow the solution to pass through the grate 142 into the second container 106 of the mixer 102. FIG. 5 illustrates one embodiment of a grate 142 suitable for use with the solution maker. As shown, the grate 142 may include a plurality of annular perforations 143. The perforations 143 may be approximately 3/16 inch diameter. Desirably, the perforations 143 are large enough to permit even flow of the solution through the grate 142 but small enough to prevent the chemical from passing through the grate 142. Thus, the grate 142 operates to support the chemical, collect debris, and allow passage of solution. In one aspect, the grate 142 is nonmetallic and includes 1½ inch fiberglass structural cross members.

Figure 20:
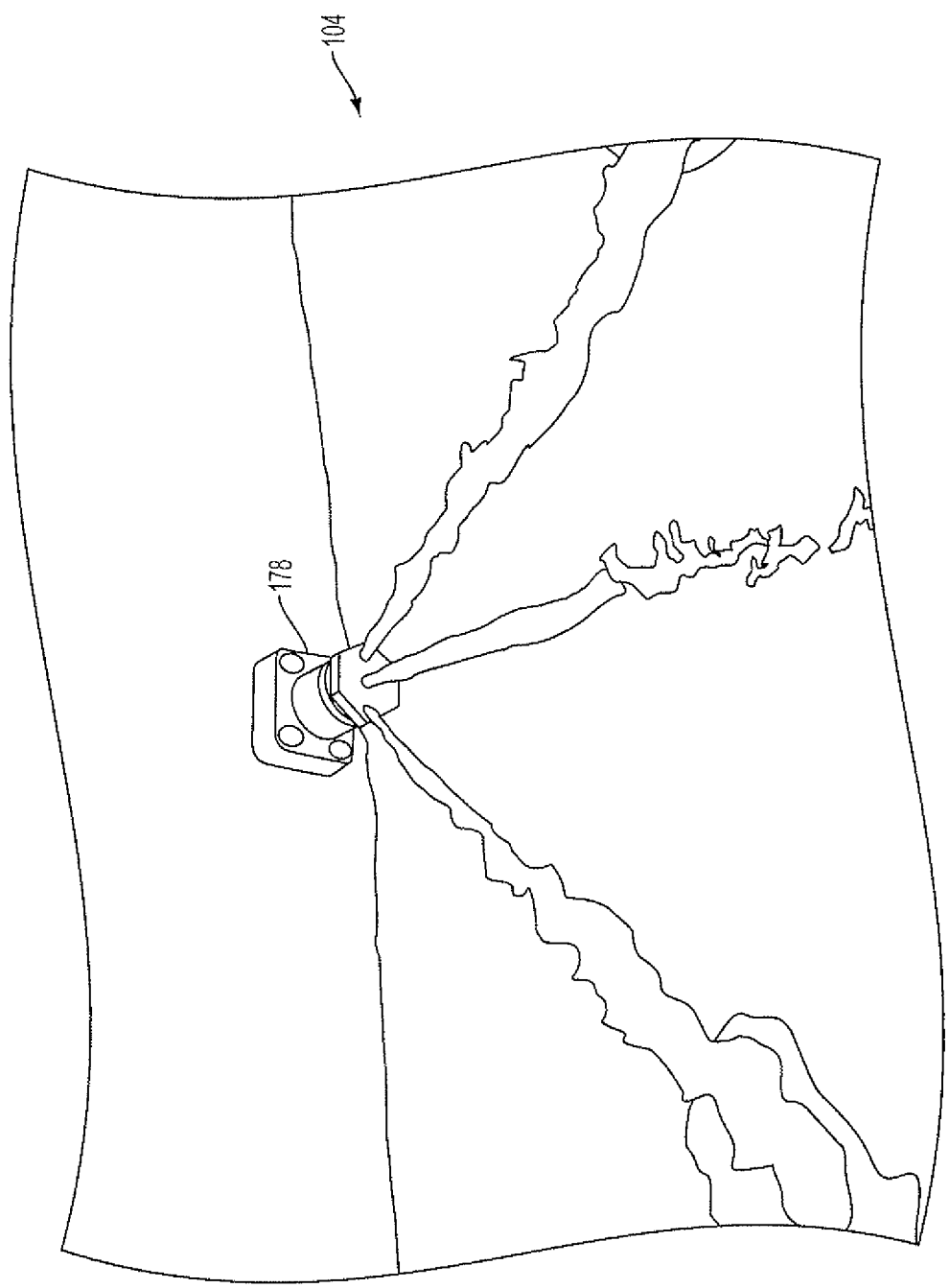
FIG. 20 illustrates an inside view of a first portion of an solution maker in accordance with one embodiment of the present invention.

FIGS. 19 and 20 show the inside of a first container 104 of a solution maker. In FIG. 19, spray heads 178 for expelling solvent and grate 142 may be seen. FIG. 20 shows flow through the spray heads 178.

As stated above, one or more liquid level sensors may be provided. The liquid level sensors are liquid level sensing devices. They may be provided with switches that send a signal to the PLC 216. As such, the liquid level sensors may be operably connected to inputs of the PLC 216. The liquid level sensors may be provided as any suitable device. In one embodiment, a suitable liquid level sensor is a mechanical switch with a float device that activates a micro switch. In another embodiment, an inductive capacitive proximity switch may be used. The liquid level sensors maintain liquid levels in the mixer 102, and more specifically in the first portion of the mixer 102, at a desired level. Generally, high water levels may overfill the mixer 102 and create a spill while low water levels may cause a transfer pump 124 to run dry and thereby damage the pump seals.

Figure 7:
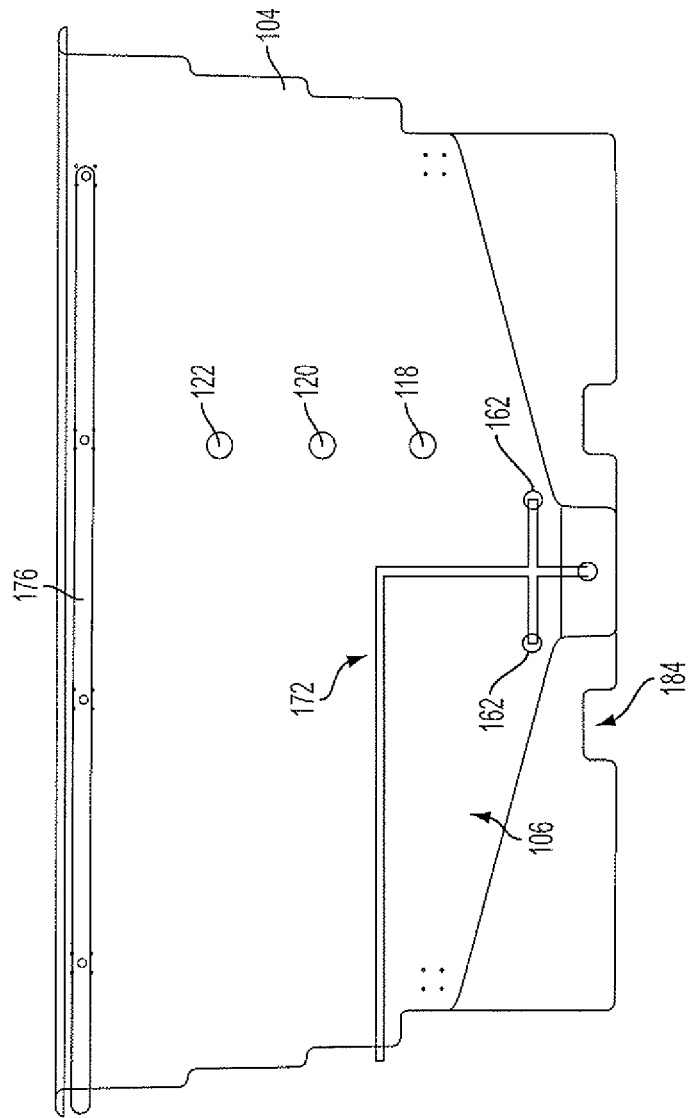
FIG. 7 illustrates a rear view of a hopper of an solution maker in accordance with one embodiment of the present invention.
Figure 9:
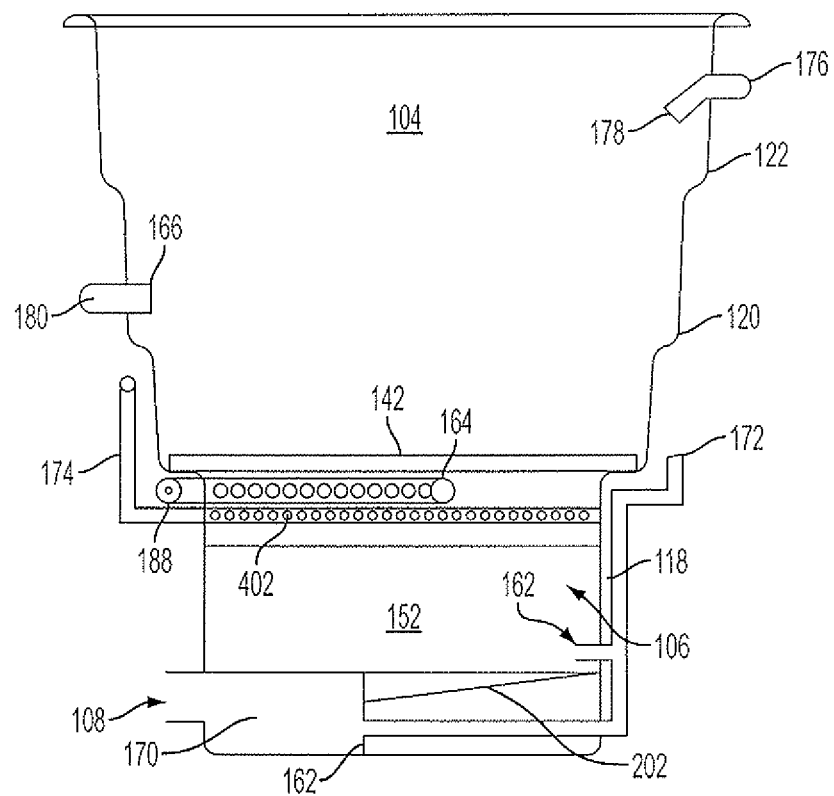
FIG. 9 illustrates a cutaway end view of a hopper of an solution maker in accordance with one embodiment of the present invention.
Figure 10:
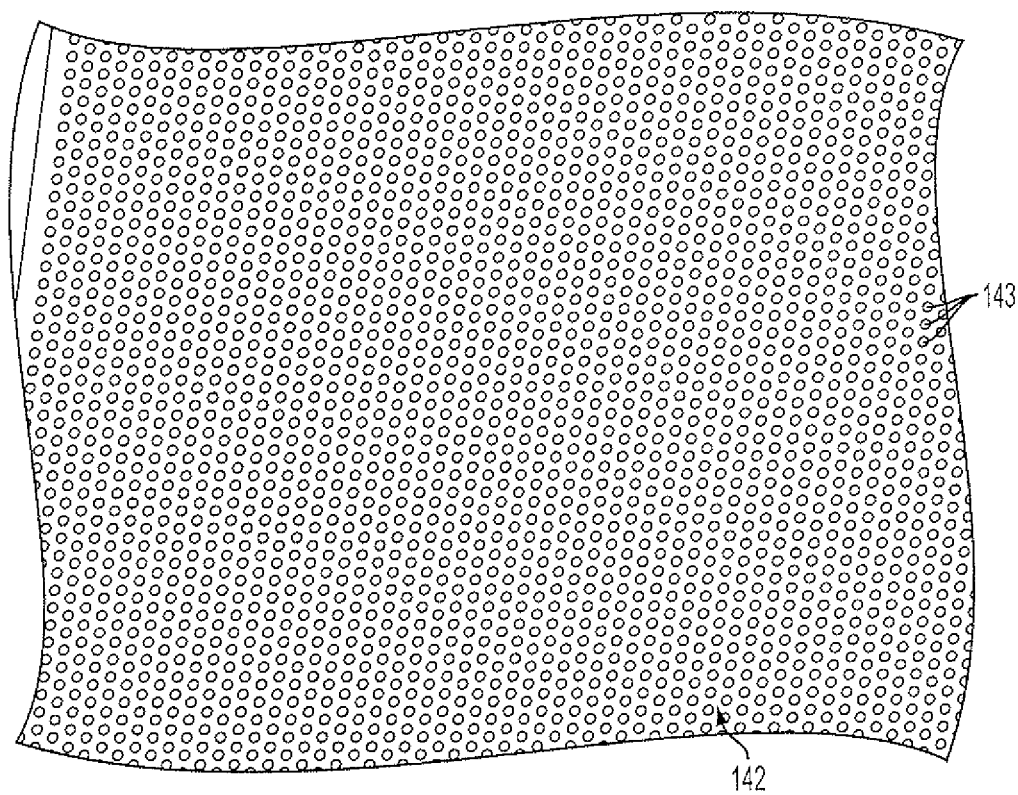
FIG. 10 illustrates a grate of an solution maker in accordance with one embodiment of the present invention.

As shown in FIG. 3, first, second, and third liquid level sensors 118, 120, and 122, respectively, are provided. Reference is made to FIGS. 7 and 9 to further illustrate the liquid level sensors. In some embodiments, more than three liquid level sensors may be provided. Alternately, no liquid level sensors may be provided. The first liquid level sensor 118 abuts the mixer 102 and is generally adjacent to the second liquid level sensor 120 and may be connected to an input of the PLC 216. The first liquid level sensor 118 detects if the water level in mixer 102 is low. If the liquid level is low and the solution maker 100 is in run mode, a pump 124 is turned to an "off" state if the solution maker 100 is in run mode. This protects pump 124 from damage caused by running dry.

The second liquid level sensor 120 is generally adjacent to the first liquid level sensor 118 and the third liquid level sensor 122 and may be connected to an input of the PLC 216. The second liquid level sensor 120 detects if an adequate amount of water or other solvent is present in the mixer 102. Based on the detection of an adequate amount of solvent, the pump 124 is activated and switched to an "on" state. The pump 124 is latched into the "on" state until the batch is completed or the first liquid level sensor 118 detects that the liquid level is low.

The third liquid level sensor 122 abuts the mixer 102 and is generally adjacent to the second liquid level sensor 120 and may be connected to an input of the PLC 216. The third liquid level sensor 122 detects if the mixer 102 is holding a predetermined level of liquid. If this level of liquid is sensed, the solvent valve 136 is switched into the "off" position, thus protecting the mixer 102 from overflowing.

The second container 106 of the mixer 102 includes a brine solution suction tube 164 connected to a conduit 148 and a brine outlet valve 154. The brine outlet valve 154 is connected to the transfer pump 124 via an outlet conduit 148. A solvent dilute inlet 146 and a pump suction inlet may be connected to the conduit 148. As shown, the pump 124 may be provided in communication with a solution sensor 132.

The solution sensor 132, in one example, measures the concentration of chemicals in the solution. In one aspect, the sensor is a conductivity sensor. For example, it could be a conductivity sensor of the terodial type, which is solid state with no contact points and measures the inductive field of the solution. However, many conductivity sensors are known in the art. In another aspect, the solution sensor 132 may be a refractometer. The refractive properties of the solution vary based on concentration. The refractometer detects the refractive index of the solution, and the PLC 216 then is able to calculate, and adjust, the concentration reading as appropriate. In other aspects, a hydrometer or other device used to detect the specific gravity of the solution could be used as solution sensor 132.

The solution sensor 132 may be configured to measure continuously, thus providing constant input rather than periodic snapshots to the PLC 216, thereby increasing the efficiency of the machine.

Alternatively, a refractometer can be used in place of the solution sensor 132. The refractive properties of the solution vary base on concentration. The refractometer detects the refractive index of the solution, and the PLC 216 then is able to calculate, and adjust, the concentration as appropriate.

In another aspect, the solution sensor 132 may be combined with a temperature sensor. This may be desirable because, in the case of the solution sensor being a conductivity sensor, the electrical resistance of the solution may vary with temperature as well as concentration. The reading from the solution sensor and the temperature sensor would be used to form a temperature compensated conductivity reading. This reading could be equated to a concentration curve which in turn expresses the reading of the solution as a temperature compensated concentration by weight. A concentration curve correlating temperature compensated conductivity to concentration may be developed for any chemicals in solution. Thus, for example, in a brine maker, a sodium chloride concentration curve is used. As stated above, in one aspect, the solution sensor measures the temperature and the conductivity of the solution. The properties of brine change with temperature and, thus, it may be desirable to measure the temperature to formulate the actual concentration.

Alternatively, the solution sensor 132 could operate without the aid of a temperature sensor. This could be desirable because the solution sensor directly measures a property that does not vary with temperature. It could also be desirable because it is less costly and less complicated to operate without sensing the temperature.

As will be described more fully below, solution that is outside of a tolerance of a target concentration may be adjusted while solution that is within a tolerance of a target concentration may be processed to a storage tank. By measuring and adjusting the concentration midstream, the solution maker produces solution continuously at a target concentration without the intervention of an operator.

Figure 13:
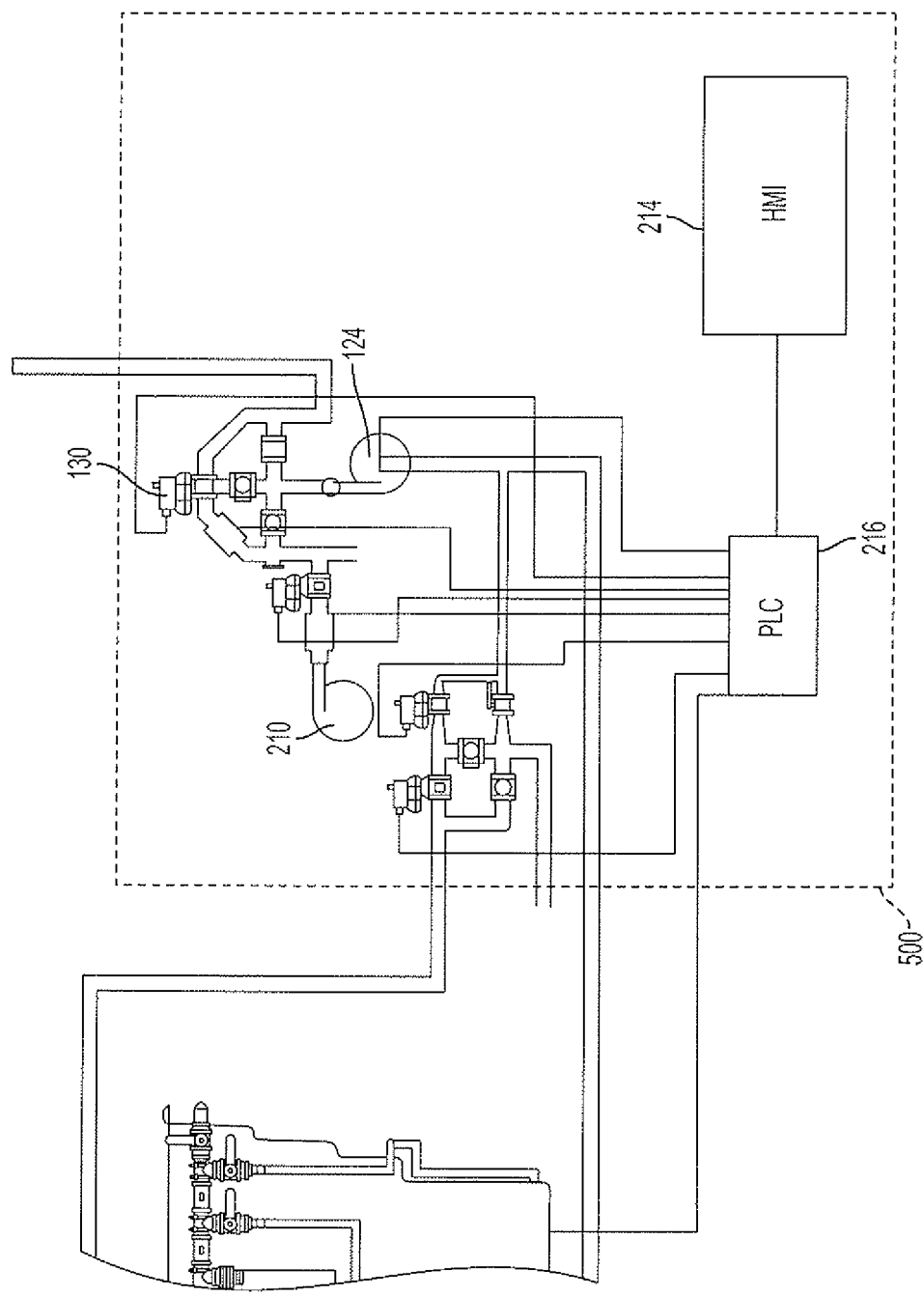
FIG. 13 illustrates a control manifold with programmable logic controller and human-machine interface of an solution maker in accordance with one embodiment of the present invention.

With reference to FIGS. 1, 12, and 13, the solution sensor 132 may be in operable communication with the PLC 216. In response to the determined concentration, the PLC 216 may activate a dilute valve 134 or a diverter valve 130 to ensure that only solution of a desired concentration is diverted to a storage tank. The target concentration of the solution may be any desired concentration. For brine solutions, a suitable target concentration may be in the range of 19.6 to 27% by weight. For example, the target concentration may be 23.3% by weight. In addition to establishing a desired solution concentration, a desired solution concentration tolerance may be established wherein a certain variance from the desired solution concentration is considered acceptable. An acceptable tolerance may be +/−0.3% of the target concentration.

The diverter valve 130 diverts flow from the pump 124 through a return tube 126 if the solution concentration is above or below the target concentration or through a finished product tube 128 if the solution concentration is within the approximately the desired solution concentration. The diverter valve 130 may be controlled by the PLC 216 (and/or by an operator or combination thereof) and depends on the target versus actual concentration. Solution that is outside of a tolerance of the target concentration may be diverted to conduit 126, valve 156, conduit 180, and agitation nozzles 166 for a further pass through the mixer 102. Again, while a specific embodiment of a diverting mechanism is provided, alternate mechanisms as would be known to one skilled in the art may be used for diverting solution outside of a tolerance of a target concentration or range of target concentrations to the mixer 102.

The return tube 126 passes flow to a valve 156, a conduit 180 and agitation nozzles 166 in the first container 104 of the mixer 102. The solution passes through the return tube 126 and returns to the mixer 102. The finished product tube 128 passes to a storage tank 410 (see FIG. 14). The diverter valve 136 may further include a manual override.

The dilute valve 134 is controlled by the PLC 216. The dilute valve 134 may communicate with the solution pump 124. The dilute valve 134 thus actuates open to pass sufficient solvent to dilute the solution when pump 124 is passing flow and the solution sensor 132 senses a solution actual concentration over the target concentration. The dilute valve 134 communicates with the solvent inlet 138. The dilute valve 134 actuates open when the pump 124 is passing flow and the solution sensor 132 senses a solution actual concentration over a target concentration. When dilute valve 134 is open, solvent from the solvent inlet 138 passes through the dilute valve 134 into the conduit 212 and into the dilute inlet 146. The solvent combines with the solution passing from the second container 106 of the mixer 102 to the pump 124. The dilute valve 134 allows sufficient solution to dilute the over-concentrated solution reaches the target concentration and thus does not over-dilute the solution. The dilute valve 134 may further include a manual override.

The sensed solution may be diluted in any suitable manner at any suitable point. For instance, the sensed solution may be diluted via addition of solvent to the outlet tube. Alternately, the sensed solution may be diluted via return to the mixer 102 and mixing with further solvent in the mixer 102.

A flow measuring device 204, shown in FIG. 12, may be provided for measuring the volume of finished solution being transferred to the storage tank. The flow measuring device 204 may be provided in communication with the PLC 216. Further, an additive pump 210, flow measuring device 206, and actuated valve 208 may be provided to allow flow into a conduit 128. The additive pump 210, flow measuring device 206, and actuated valve 208 may be in communication with the PLC 216 to enable mixing of an additive with the solution as it is transferred to a storage tank, as is described more fully below.

During use, solids such as dirt and silica may infiltrate the solution maker. These solids typically cause sediment build up in solution making machines. Generally, it is desirable for the solution to be as clean as possible. Foreign material in the solution is abrasive. The abrasiveness can produce excess wear on pumps, flow meters and valves associated with the production and application of the brine solution. Sediment deposits caused by foreign material in suspension of the solution over time settle out and form layers of sediment in the storage tank. Cleaning the sediment can be time consuming and can require the machine to be offline.

In one embodiment, the second container 106 of the mixer 102 is configured for easy cleaning. The second container 106 (see, for example, FIGS. 3 and 21) thus includes at least one sloped plane along which sediment slides to a sump located at the bottom of the sloped plane. A suitable slope for the at least one sloped plane is approximately 15 degrees. In the embodiment shown, the second container 106 includes a first sloped plane 150, a second sloped plane 152, and a third sloped plain 202. Sediment that passes through the grate 142 collects on the bottom of the second container 106 of the mixer 102 in a sump area formed by the first sloped plane 150, second sloped plane 152, and the third sloped plane 202. The sump area may be, for example, approximately 12 inches by 12 inches. Other coatings that allow easy cleaning are well known to those of ordinary skill in the art.

A sump outlet 108 may be provided to allow the sediment to be flushed out of the mixer 102. Such flushing may be done via spray bars 402 (shown, for example, in FIGS. 2 and 9) and a nozzle 162 (shown, for example, in FIG. 3). A plurality of nozzles, for example a nozzle provided on each wall to the left, right, and back side of the sump, may be provided for forcing sediment through the sump and out of the solution maker. The solution maker may be configured for flushing of the sediment or for manual flushing of the sediment. Further, the sediment may be flushed from the mixer 102 while the chemical is in the first container 104 of the mixer 102 or may be flushed from the mixer 102 when there is substantially no chemical present in the first container 104 of the mixer 102. The grate 142 in the mixer 102 supports the weight of the chemical, thus enabling the sediment to be flushed while the chemical is in the mixer 102.

Thus, the solution maker further provides a method for separating foreign material such as un-dissolved silica, dirt, and gravel from the mixer 102. The foreign material may accumulate in a sump area from which the deposits may be flushed at a later time. Further, the solution maker enables a flushing of deposits of foreign material from the mixer 102 while a chemical remains in the first portion of the mixer 102.

In another embodiment, the solution maker may lack a cleanout system as described above. In this alternate embodiment, a mixer 102 may be used with less manufacturing, thereby providing cost savings in environments where cleaning the mixer 102 is either not needed or where cleaning the mixer 102 on a regular basis is not required. Here, systems that do not accumulate debris or are relatively clean may be used with a mixer 102 without a cleanout.

The solution maker, in some embodiments, may hold 10,000-20,000 pounds of a chemical such as salt. Thus, the mixer 102 is manufactured to be sufficiently strong to support the load. The mixer 102 may be made of any suitable material. In one embodiment, a suitable material from which the mixer 102 may be constructed is fiberglass. Fiberglass is strong and is not affected by salt solutions. More specifically, the mixer 102 may be constructed of 16,000 lb tensile strength fiberglass and isophthalic resin. Other suitable materials for the mixer 102 include but are not limited to stainless steel and polypropylene. The inside surfaces of the mixer 102 may be coated with a ceramic resin. Such coating may be, for example, approximately 0.050 inches thick. Structural integral ribs may be provided within the mixer 102 to limit flex to within one inch from full to empty. In one embodiment, the overall thickness of fiberglass and resin in the mixer 102 is approximately 0.35 inches. Structural areas such as ribs, corners, and floor may be provided with additional layers of woven fiberglass mat for an overall thickness of approximately 0.50 inches.

In use, the solution maker may be used by a highway department for producing brine solution to deice roads. The solution maker may be used outdoors in cold weather. Thus, the solution maker may be provided with one or more of its components being heated. Heating elements 168 (see, for example, FIG. 3) may be provided in the mixer 102. A temperature sensing device may be provided in the mixer 102 in communication with the PLC 216. The temperature sensing device indicates if the heating elements 168 need to be activated to raise the temperature of the mixer 102. These elements may be thermostatically activated on and off and capable of sustaining a temperature of 32 degrees Fahrenheit or higher to prevent the vessel from freezing.

Thus, the mixer 102 may be heated to minimize the chance of the mixer 102 freezing in cold weather. In one embodiment, silicone mat heaters may be built into the mixer 102. For example, two nine-foot square silicone mats may built into the mixer 102. A roll tarp such as a permanently mounted roll tarp may be used in conjunction with the heaters for heating the mixer 102. Such roll tarp may be provided with arches and a roll mechanism and is useful for keeping heat in and debris out. If provided, the roll tarp may be mounted over an open top of the mixer 102. Other heating methods are well known to others of ordinary skill in the art.

Figure 11:
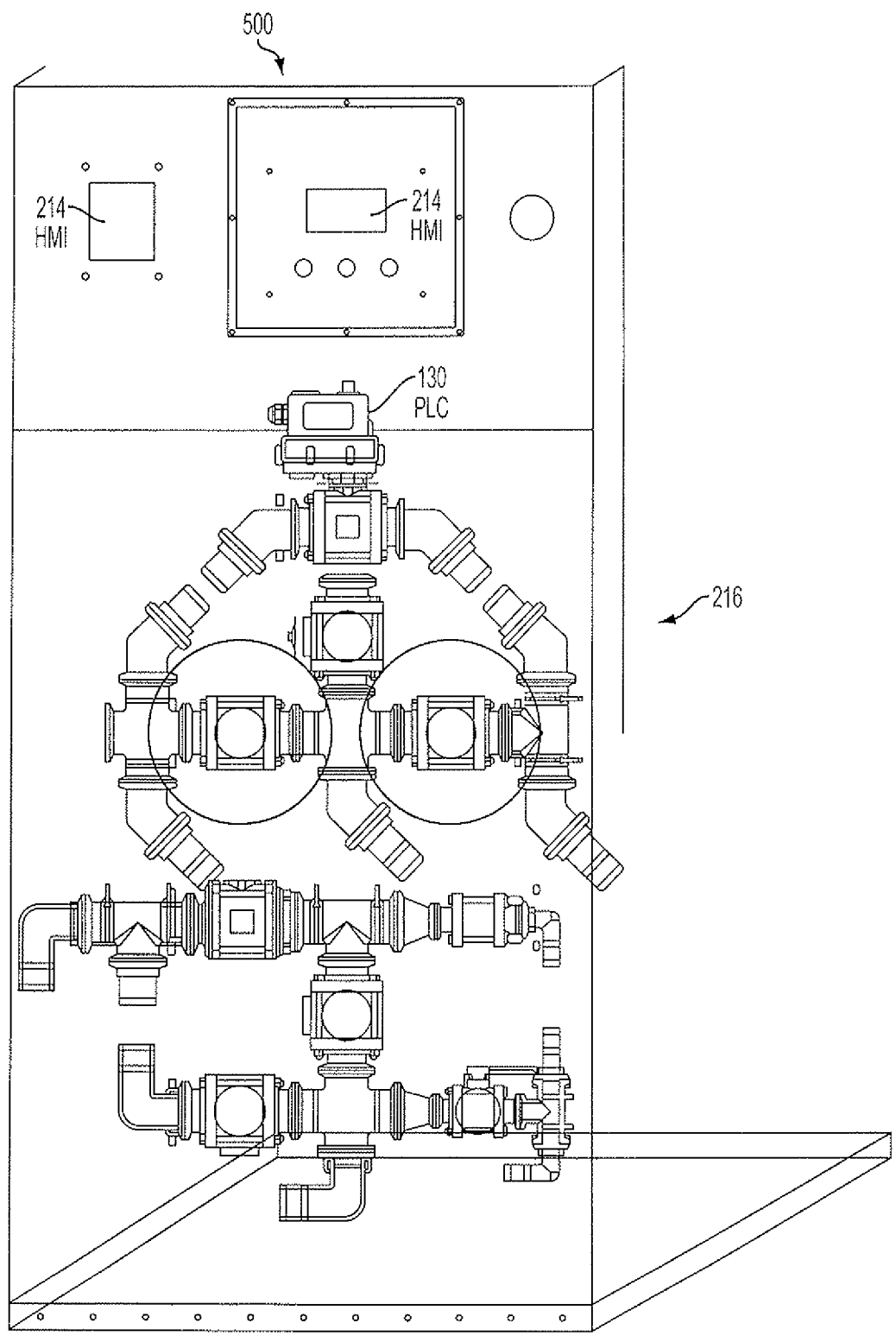
FIG. 11 illustrates a control panel of an solution maker in accordance with one embodiment of the present invention.

FIGS. 11-13 illustrates embodiments of a control panel of the solution maker. The control panel 500 may be included of mechanical flow control devices, the conductivity sensor 132, the PLC 216, and the human-machine interface (HMI) 214. In another embodiment, the PLC 216 is in communication with HMI 214 to create a data log. Solution produced and diverted to the storage tank is measured via a flow measuring device 204 (see, for example, FIG. 12) and recorded in the PLC program 216. This measurement may be via a flow meter of a flow switch. Calculations may be introduced into the PLC program 216 to formulate the amount of solution produced, the chemical usage, and the solvent usage in the production process. The data log thus creates reports that may be viewed on the HMI 214 or printed onto a printer. These reports may be created daily and may show a running season total of solution produced as well as chemical and solvent usage (and additive usage if an additive is introduced into the solution). Multiple user reports may be generated. For example, a daily and season total may be created and tailored for separate individuals for accounting and billing purposes.

The control panel 500 may include one or more processors that control the operation of the control panel. The control panel 500 may also include internal memory including at least one of solid state (RAM, ROM, Flash, magnetic, and the like) and dynamic memory (CD, DVD, Hard Drive, etc.). The control panel may have no or various input/output pathways including but not limited to wired (for instance, USB, Firewire, and other wired pathways), wireless (for instance, IEEE 802.11*, Wi-Max, cellular, satellite, RF, Bluetooth, and other wireless pathways), and media-related interfaces (for instance, CD, DVD, and other media-related interfaces). The control panel 500 may optionally include the ability to connect to a network or other devices including the internet. Further, the control panel 500 may optionally include a location determination system (including but not limited to cellular, satellite, and the like). The location determination system may provide information that allows the location of the control panel 500 to be communicated to another device or network. Further, the control panel 500 may be able to use this information in modifying desired concentrations, additive mixing, and the like, based on the determined location. For instance, the control panel 500 may provide more additives based on one location compared to less additives based on another location. Alternatively, it may be provided its location based on user input or a location transmitted to it remotely.

In one example, the PLC 216 may handle operations independent of the HMI 214. In other situations, the PLC 216 may be replaced by the HMI 214 alone. Further, the PLC may be networked with other computers or computing systems thereby allowing communication between them and/or downloading of new information to the PLC 216. For instance, a central command center may instruct PLC 216s in various locations to increase the use of one chemical/solvent/solute/slurry compared to another. Also, the networking of the PLCs 216 (for example, to the internet or other network) may allow firmware updates or data uploads regarding usage and other metrics. Further, data keeping functions may provide reports or requests to the network for data keeping and/or ordering of more materials.

Yet further, the networking of the PLCs 216 may allow remote operation of the system. For instance, one may operate one HMI to control two or more mixers 102.

The reports may additionally provide a quantitative measurement of solution or other output produced and/or time needed to make the solutions or other mixtures. These reports may be output in one or more forms including forms appropriate for storage in a database (SQL, Microsoft Access, and the like).

The control panel enables regulation of solvent flow into the first portion of the mixer 102. The solvent concentration and/or actual temperature compensated concentration may be monitored and, if the concentration is out of the tolerance for the target concentration, the solution may be returned to the mixer 102. Alternately, the solution may be diluted midstream after exiting the mixer 102 to meet the desired concentration level. Solution of a desired concentration may be processed to a holding tank. As shown, the PLC, conductivity analyzer, and other electric controls may be mounted in an electric enclosure on the rear side of the panel. The main panel of the control panel may include valve labels and valve functions. Information displayed on the screen may include the actual production solution concentration in the form of % concentration by weight, the gallons of solvent used to make solution, self-diagnostic of the conductivity sensor, self-diagnostic of electric valves (indicating if and what valve is not functioning normally), valve status of open or closed, and status of the machine along with the status of electrical components. In one embodiment, the display is multicolored with a green screen indicating system normal, a red screen indicating machine fault, and an orange screen indicating setup parameters.

The holding tank or tanks may be filled individually or filled in an order specified by the control panel or HMI. For instance, a first holding tank may be designated as the location for the output of the solution maker 100 or mixer 102. Next, another tank may be filled after the first holding tank is full (based on a predetermined amount of solution dispensed or a sensor on the tank). The control panel may be programmed to fill a number of tanks then stop the dispensing and/or mixing process.

The solution maker may be configured as self-diagnostic. Accordingly, the valves and sensors may be in operable communication with the controller to confirm the current state. In the event of a component failure, the system may be configured to shut down and provide information on the specific failure along with a corrective measure, including how to manually override problem and part number failure.

Figure 14:
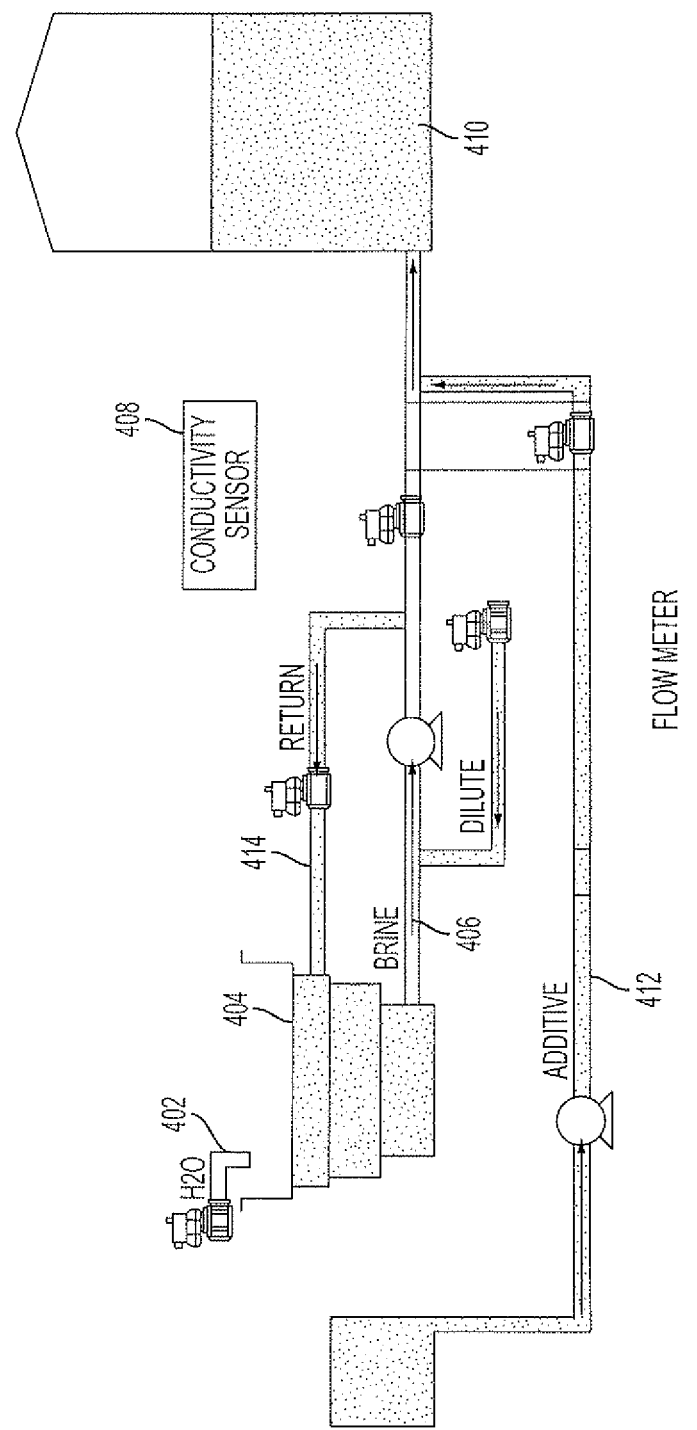
FIG. 14 illustrates flow of an solution maker in accordance with one embodiment of the present invention.
Figure 15:
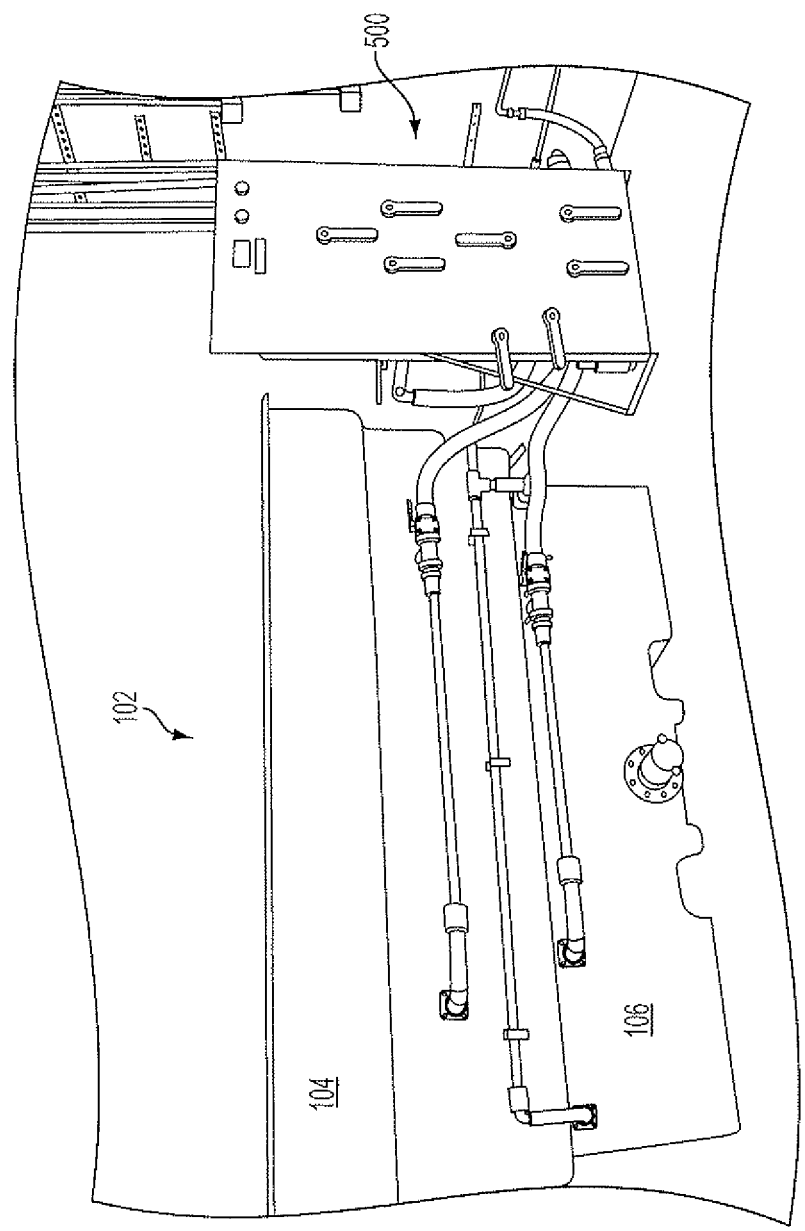
FIG. 15 illustrates a perspective view of an solution maker and control panel in accordance with one embodiment of the present invention.

FIG. 14 illustrates flow of an solution maker in accordance with one embodiment of the present invention. As shown, solvent 402, such as water, passes into the mixer 102 404. In the mixer 102 404, the solvent mixes with a chemical, such as salt, to form a solution, such as brine. The solution 406 exits the mixer 102 404. A conductivity sensor 408 measures the conductivity of the exiting solution 406 and thereby determines the concentration of the solution 406. If the concentration is within the desired range, the solution 406 continues to a storage tank 410. If desired, an additive 412 may be added to the solution 406 after it is determined to be at an acceptable concentration. If the solution 406 is not at the desired concentration, it is returned 414 to the mixer 102 404. This process is described more precisely below.

In operation, a chemical, for example rock salt, is deposited in the first container 104 of mixer 102. The pump 124 is initially in the "off" state while the solvent valve 136 is in the "on" position. An operator at the HMI 214 enters a desired target solution concentration, volume of solution to be produced, and, if desired, a ratio of additive in the finished product. Upon entering this information, the operator activates a start switch which activates the PLC program into the operation mode. The operation mode begins solvent flow from valve 136 into the mixer 102 104. The first container 104 of the mixer 102 receives solvent from spray heads 178 via the solvent inlet 138, the actuated valve 136, the conduit 200, the valve 186, the valve 158, and the conduit 176. The solvent dissolves the chemical, and the formed solution passes through the grate 142 into the second container 106 of the mixer 102. Solvent continues to enter through the spray heads 178 into the mixer 102 until the third liquid level sensor 122 detects the mixer 102 is full of liquid and activates the solvent valve 136 into the "off" position so that the mixer 102 does not overflow.

While the mixer 102 receives solvent, the second liquid level sensor 120 detects whether an adequate amount of solvent is present in the mixer 102. When an adequate amount of solvent is present in the mixer 102, the pump 124 is actuated into an "on" position. The pump 124 is latched into the "on" position until the batch is completed or the first liquid level sensor 118 detects that the liquid level is low.

The pump 124 transfers the solution from the second container 106 of mixer 102 through the first suction tube 164, the conduit 188, the valve 154, conduit, dilute inlet 146 and into the suction side inlet of the pump 124. The pump 124 may be configured to pump approximately 5,000 gallons of solution per hour with a dynamic head of 45 feet.

The solution sensor 132 senses the conductivity and the temperature of the solution transferred by the pump 124 from the mixer 102 106. The solution sensor 132 measures the electrical resistance of the solution flowing across the solution sensor 132. This measurement may be done by a probe and conductivity analyzer of the solution sensor 132. The electrical resistance is compared to the temperature of the solution and these two variables are equated to form a temperature compensated conductivity reading. This reading is equated to a chemical concentration curve which in turn expresses the reading of the solution as a temperature compensated concentration by weight. A concentration curve correlating temperature compensated conductivity to concentration may be developed for any chemicals in solution. Thus, for example, in an brine maker, a sodium chloride (and/or other salt) concentration curve is used.

If the solution is over-concentrated the conductivity analyzer, then communicates with the PLC 216, which in turn opens the dilute valve 134 to permit solvent to dilute the over-concentrated solution exiting the mixer 102 106 to the target concentration. When the dilute valve 134 is activated, solvent from the solvent inlet 138 passes through the dilute valve 134 and into the dilute inlet 146 and combines with the solution passing from the second container 106 of the mixer 102 to the pump 124. The dilute valve 134 remains activated until the solution reaches the target concentration. The over-concentrated solution is diverted from the pump 124 by the diverter valve 130 and passes through the return tube 126 into the first container 104 of the mixer 102 via the conduit 180, valve 156 and agitation nozzles 166.

If the solution is under-concentrated, the under-concentrated solution is diverted from the pump 124 by the diverter valve 130 and passes through the return tube 126 into the first container 104 of the mixer 102 via valve 156, conduit 180, and agitation nozzles 166.

If the solution is within a tolerance level of a target concentration, the solution is diverted from the pump 124 by the diverter valve 130 and passes through the finished product tube 128 and into a storage tank (not shown). Optionally, if trucks are being loaded with solution during operation of the solution maker, solution within a tolerance level of a target concentration may be diverted directly to the a truck via a truck fill hose. When diverting solution to a storage tank, a remove till electric plug wiring harness may be provided to shut off filling of the storage tank when full. Thus, a sensing device may be provided for sensing the state of the storage tank.

Over time the liquid level drops in the mixer 102 due to solution within the tolerance level of the target concentration being sent to the storage tank. First liquid level sensor 118 detects if the water level in mixer 102 is low and turns pump 124 to the "off" state if the solution maker 100 is in operate mode. Alternately, solvent and chemicals may be continuously provided to the solution maker. In a semi-continuous embodiment, the solution maker 100 continuously produces solution of a desired concentration. Thus, the solution maker 100 may be configured for continuous batch processing. Continuous batch processing enables production of more solution per amount of time the solution maker is running.

The configuration of the solution maker thus offers a downward flow design. In the first container 104 of the mixer 102, solvent flows downwardly through the chemical to form the solution. Upward flow design is well known in the art but would also include pumps to counteract gravitational forces, which assist the downward flow design. It is appreciated that aspects described herein include both upward and downward flow designs.

The solution passes through the grate 142, into the second container 106. The solution with the highest concentration settles to the bottom of the second container 106 where the solution is removed for processing.

A data log may be generated by the solution maker for recording how much solution is produced and the quantity of ingredients (chemical and solvent) used.

FIGS. 3, 5, and 20 further illustrate the easy cleaning aspect of the solution maker.

Figure 21:
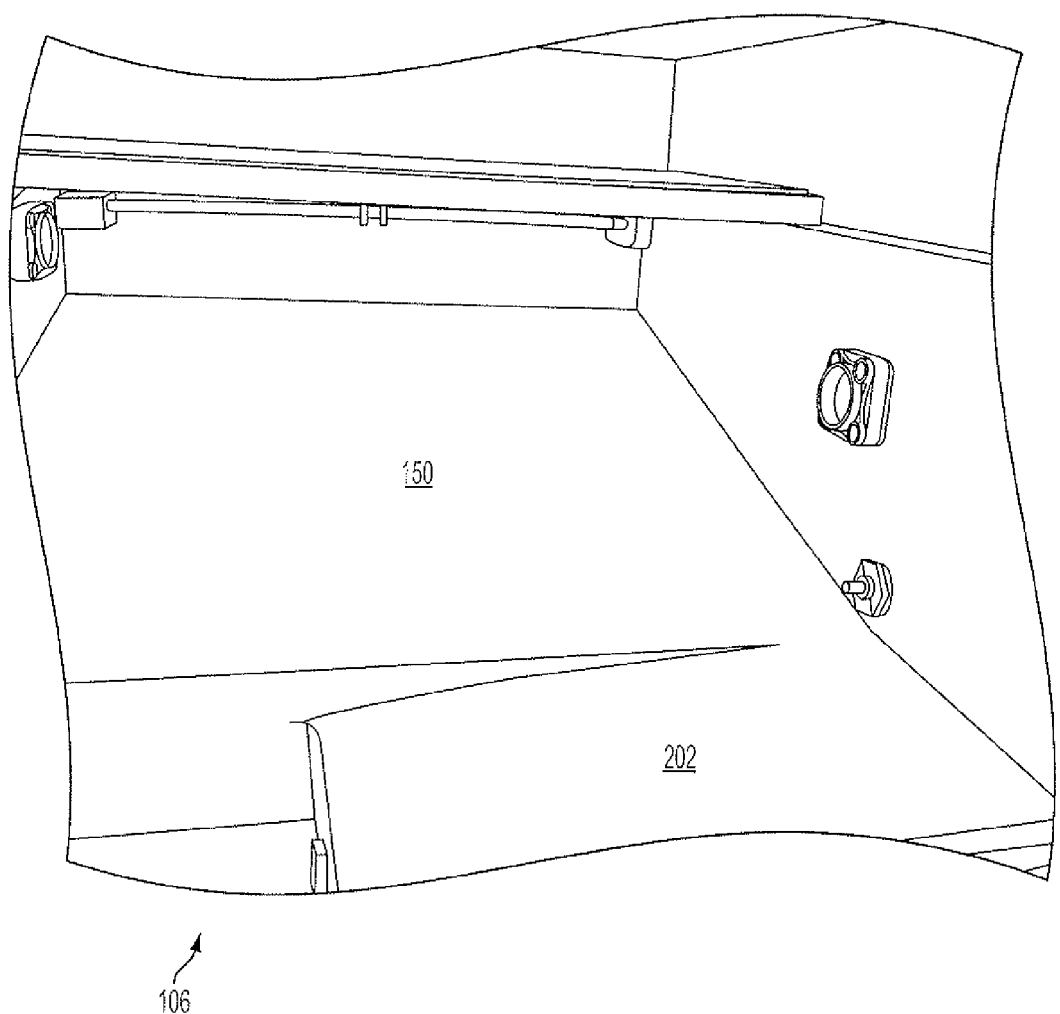
FIG. 21 illustrates an inside view of a second portion of an solution maker in accordance with one embodiment of the present invention.

FIGS. 3, 5, and 21 illustrate the sloping surfaces and sump of the second container 106 of the mixer 102. Due to the sloping surfaces, sediment that passes through the grate 142 collects on the bottom of the second portion in an area adjacent a sump outlet 108. Any suitable number of sloping surfaces may be used. In the embodiment shown, a first sloped plane 150, a second sloped plane 152 and a third sloped plain 202 are provided. Thus, sediment that passes through the grate 142 collects on the bottom of the second container 106 of the mixer 102 in an area formed by the first sloped plane 150, the second sloped plane 152 and the third sloped plane 202. The sump outlet 108 allows the sediment to be flushed from the mixer 102 using the spray bars 402 and nozzles 162, as described above.

Figure 4:
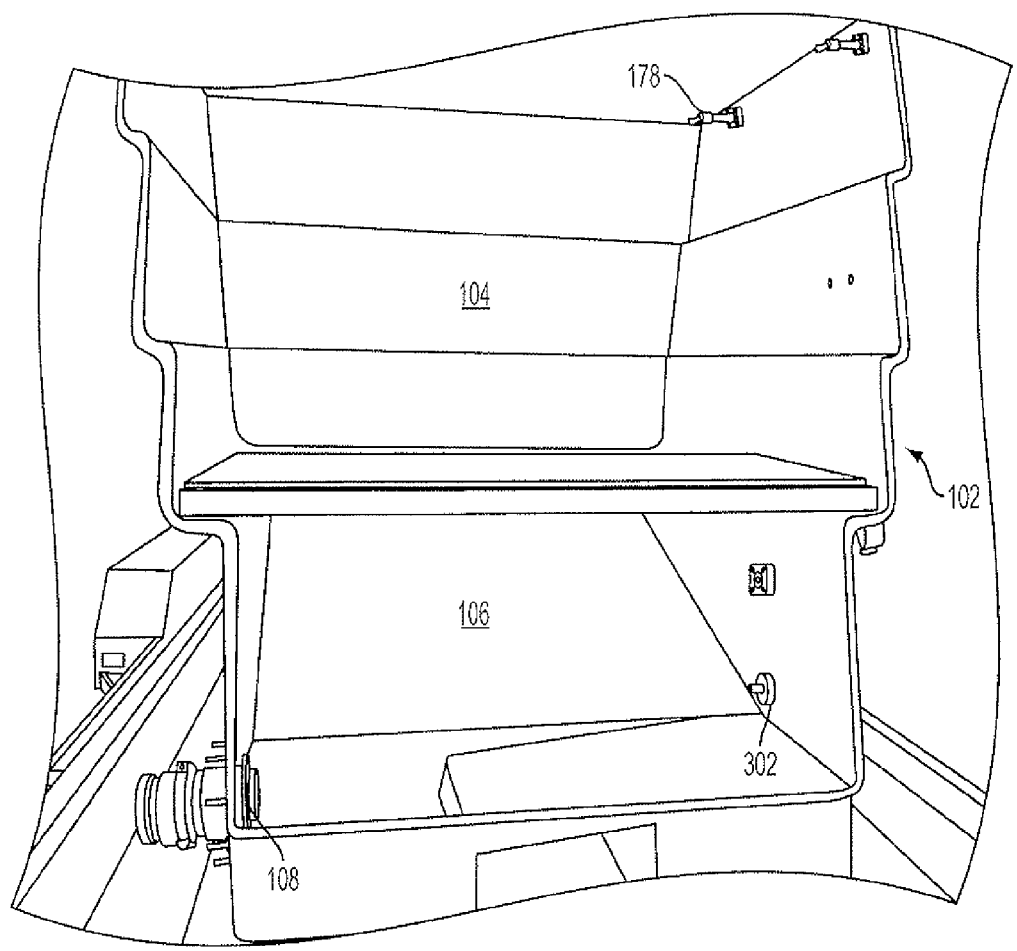
FIG. 4 illustrates a cutaway perspective view of a hopper of an solution maker in accordance with one embodiment of the present invention.

FIGS. 2-4 illustrate the mixer 102. The mixer 102 includes a first container 104 and a second container 106. Nozzles 162 are provided on the second container 106. The nozzles 162 spray a liquid substantially in the direction of sump outlet 108, provided in the second container 106. In one embodiment, the liquid that is sprayed by the nozzles 162 is water. Thus, liquid is expelled from the nozzles 162 and directed towards sediment accumulated adjacent the sump outlet 108. Force from the spray forces the sediment to pass through the sump outlet 108. Of course, any other suitable means for forcing the sediment through the sump outlet may be used.

As further illustrated by FIGS. 19 and 20, the first container 104 of the mixer 102 may include a spray head 178. Alternately, the first container 104 may include a plurality of spray heads. The spray head 178 receives solvent from the solvent inlet 138 via the solvent valve 136.

Figure 6:
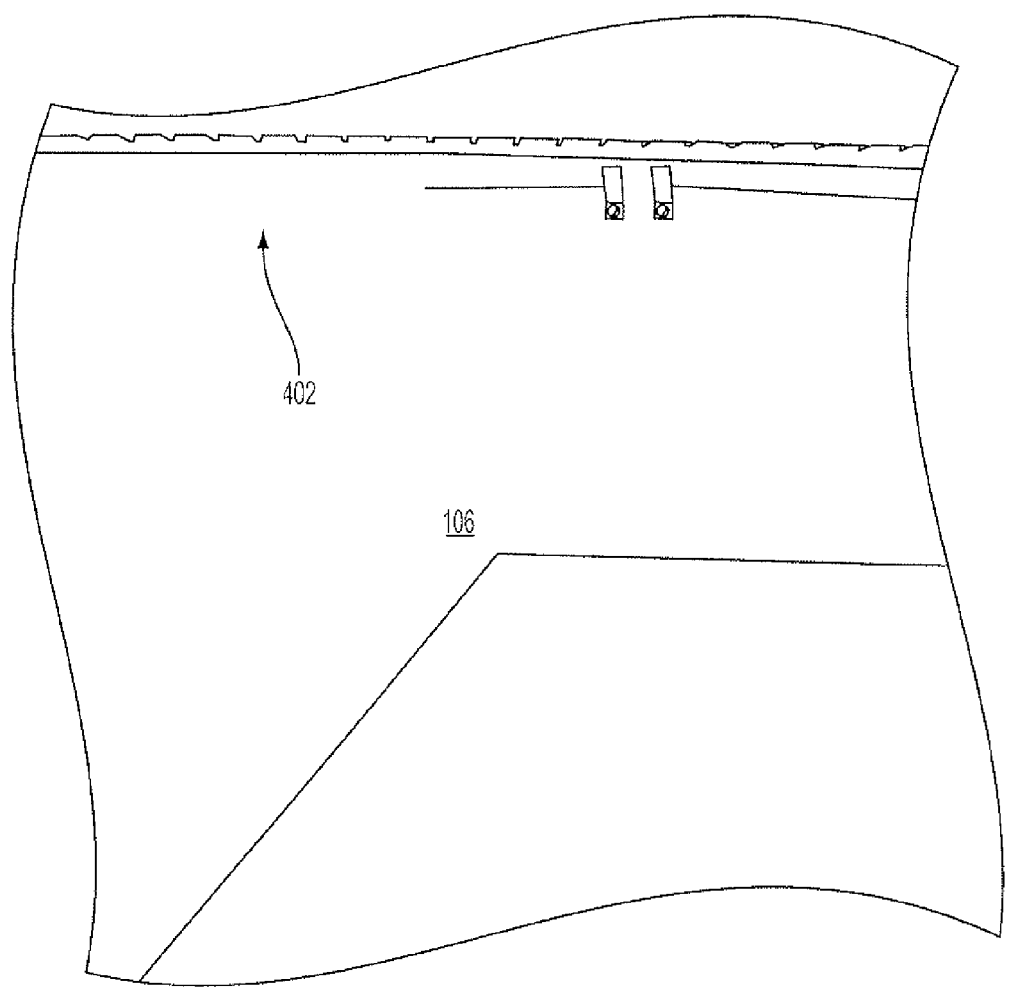
FIG. 6 illustrates an interior view of a hopper of an solution maker in accordance with one embodiment of the present invention.

FIGS. 6 and 9 illustrate a plurality of spray bars 402 (only one side shown) that are located on opposite sides of second container 106 of the mixer 102. The spray bars 402 spray a liquid that forces sediment towards the sump outlet 108.

As described above, during use of the solution maker, sediment may pass through the grate 142 into the second container 106 of the mixer 102. Sediment that settles on first sloped plane 150 and second sloped plane 152 is forced downward towards the bottom of second container 106 via spray bars 402 that are positioned along the first sloped plane 150 and the second sloped plane 152. The spray bars 402 are supplied with liquid via liquid supply 138, conduit 200, water inlet 186, flush valve 160, and conduit 174. The sediment that is located in the bottom of second container 106 is forced out of the sump outlet 108 of the second container 106 via the nozzle 162. Liquid is supplied to the nozzle 162 via liquid supply 138, conduit 200, water inlet 162, and conduit 172.

The chemical is supported within the first container 104 by the grate 142. Thus, the sediment may be flushed from the mixer 102 while chemical is in the first container 104 of the mixer 102. Alternately, the sediment may be flushed from the mixer 102 when there is substantially no chemical in the first container 104 of the mixer 102.

FIG. 12 illustrates a control panel for an solution maker wherein an additive may be supplied to the solution. Thus, the solution maker may be used to inject an additive into the desired solution concentration at a desired ratio. For example, when the solution maker is used to make brine, additives that make brine work at lower temperatures or reduce the corrosiveness of brine may be beneficial.

Typically brine is used at approximately 20 degrees Fahrenheit or above. By mixing additives with the brine, the effective temperature for using brine may be reduced to approximately 0 degrees Fahrenheit, thereby providing a solution of melting snow and ice at lower temperatures. Salt brine is naturally corrosive and the corrosive nature of the brine leads to corrosion of bridge decks, vehicles, and roadways. Reducing the corrosive nature of brine and lowering the freezing point of brine by mixing at least one additive at a predefined ratio into the brine has benefits to the environment. Generally, these additives are costly compared to the cost of brine solution. Optionally, a system may include the ability to add a desired amount of additive into the solution when needed and thus reduce cost and enable an enriched product to be produced when needed.

Using the embodiment of FIG. 12, a user enters a desired percentage of total volume in which an additive is to be processed via the HMI 214 to the storage tank where the finished product is stored. As brine is produced and diverted to the storage tank, a predetermined ratio of additive is placed into the conduit 128 via the pump 210 controlled by the PLC 216 connected to a supply tank for the additive (not shown). The pump 210 transports the solution. A flow meter 206 is in communication with the PLC 216 and measures the additive volume. An actuated valve to shut off flow is controlled by the PLC 216.

Thus, in the embodiment shown in FIG. 12, a solution may be produced at desired concentrations and, as the solution is transported to a holding tank, a desired ratio of additive based on volume of solution may be mixed with the solution. This ratio may be between 0 and 100%, as desired. The solution maker thus produces brine and has the ability to mix and inject any ratio of additive into the solution.

Figure 16:
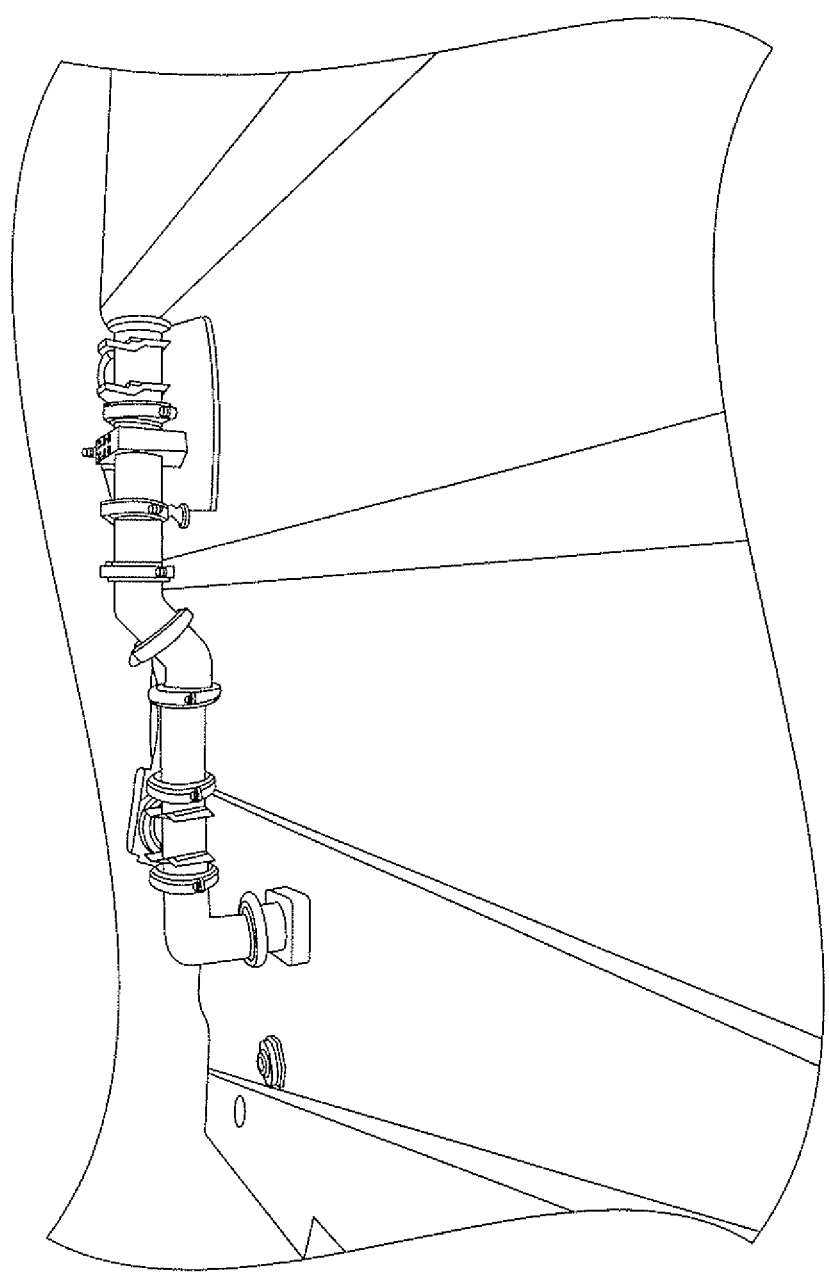
FIG. 16 illustrates a perspective view of a float assembly in accordance with one embodiment of the present invention.

FIG. 16 illustrates a perspective view of the float assembly on the mixer 102.

Figure 17:
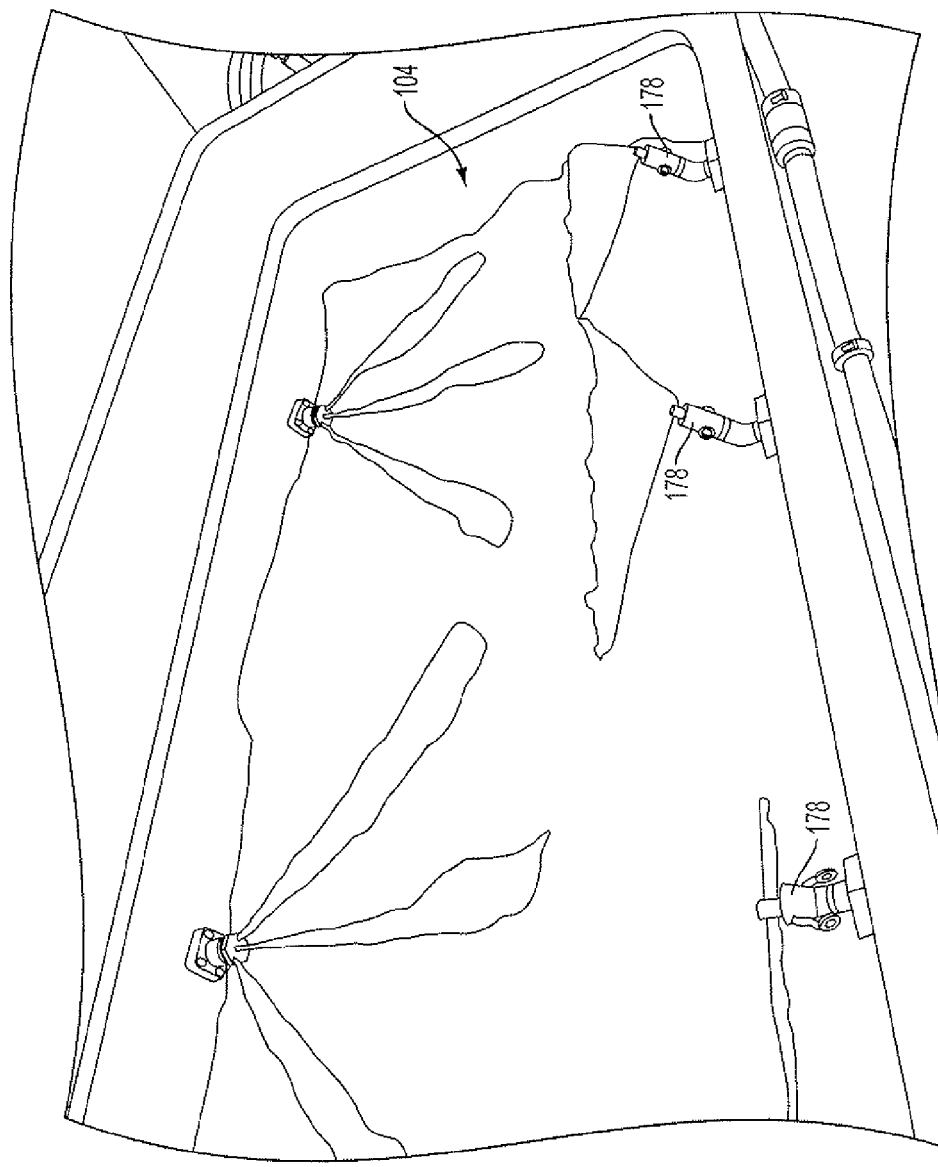
FIG. 17 illustrates solvent being added to a first portion of an solution maker in accordance with one embodiment of the present invention.

FIG. 17 illustrates solvent being added to a first container 104 of an solution maker via spray heads 178.

Figure 18:
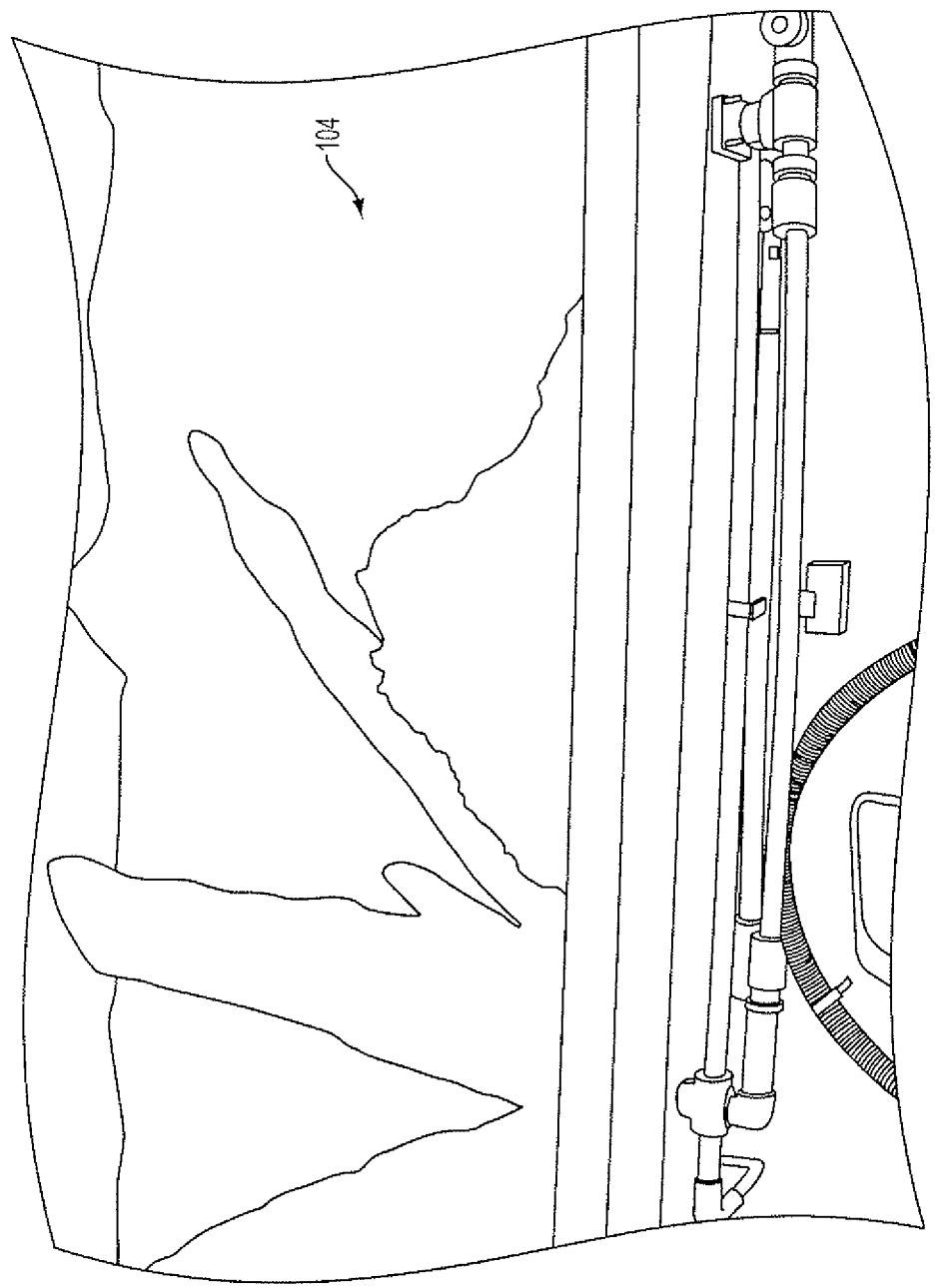
FIG. 18 illustrates mixing of solvent with chemical in a first portion of an solution maker in accordance with one embodiment of the present invention.

FIG. 18 illustrates mixing of the solvent with the bulk chemical in the first container 104 of the solution maker.

FIG. 19 shows first container 104 with spray head 178 over grate 142 before any bulk chemical has been added to the first container 104.

FIG. 20 shows first container 104 being sprayed with a solvent from spray head 178 over a bulk material.

FIG. 21 shows second container 106 with first sloping plain 150 and third slipping plane 202 showing a solution having been created and flowing toward brine outlet valve 154.

FIGS. 22-25B show various processes that may be used in conjunction with the solution maker 100 and additional components.

Figure 22:
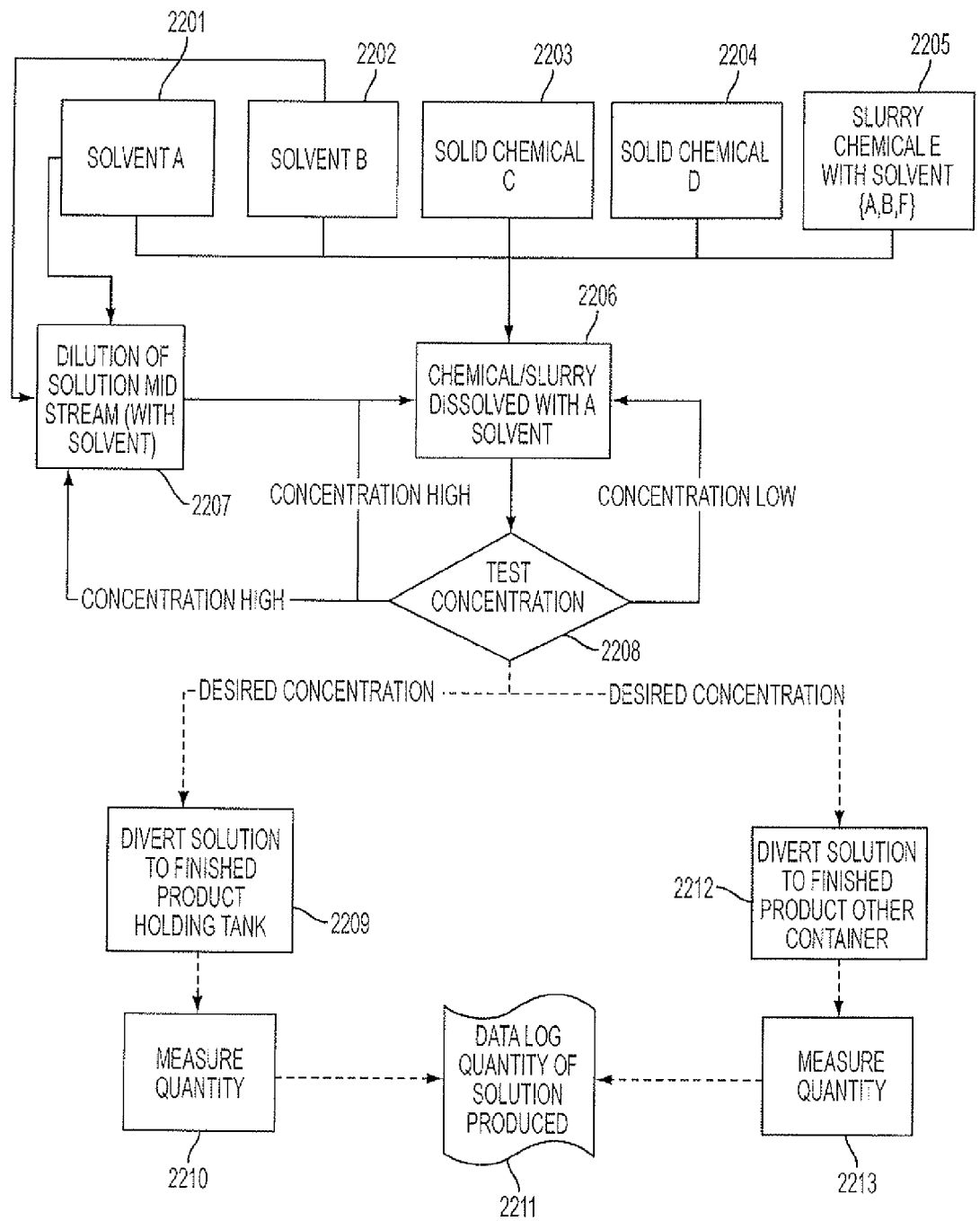
FIG. 22 is a flow chart that illustrates the process of making a mixture of chemicals, slurries, and/or solvents in accordance with aspects of the invention.

FIG. 22 illustrates the process of creating a mixture of solutes and solvents. Although a single solute and a single solvent are often combined to make a slurry, the aspects of the invention are not so limited. Multiple solutes and solvents can be made into a slurry. For example, solvent 2201 and solvent 2202 are combined with solid chemical 2203 and solid chemical 2204 to produce a new slurry 2206 in FIG. 22. Although solid chemicals are used in this illustration, liquids can also be used. For example, slurry 2205 can also be added to solvents 2201 and 2202 to produce slurry 2206. In the case that slurry 2205 is the only chemical being added to the solvents, the solution maker would function as an dilution machine.

As described above, the solution maker can be used to ensure slurry 2206 is at, above, or below a desired concentration. In step 2208, the concentration of slurry 2206 is tested by any suitable means, including measuring refractive index, specific gravity, and/or conductivity. As described above, temperature may also be measured in order to more accurately correlate conductivity/specific gravity/refractive index with the actual concentration of the chemicals in the slurry. For instance, in some situations, the concentration may be tested by a sensor at the location of the mixer 102. In other situations, the actual sensor may be located apart from the physical location of the mixer 102. For instance, in cold climates, the sensor may be placed in a heated building while the mixer 102 is outside, to protect the sensor and associated processing/control equipment.

If slurry 2206 is not concentrated enough, the solutes or slurries 2203, 2204, and 2205 will be added to slurry 2206. If slurry 2206 is too concentrated, solvents 2201 and/or 2202 will be added to slurry 2206 in step 2207.

Once the desired concentration is reached, as measured by step 2208, slurry 2206 can optionally be released, as indicated by dotted lines in FIG. 22, into one or more holding tanks 2209 and/or other containers 2212. Alternatively, the process could continue to produce more of slurry 2206 until the mixer 102 is full. The quantity of solution diverted to holding tank(s) 2209 and/or other container(s) 2212 is determined in steps 2210 and 2213. This quantity, along with other information about the product, such as the time of delivery, chemicals and solvents used, concentration settings, etc. can be recorded in data log 2211.

The data log 2211 can be used to keep a record of the contents of holding tank(s) 2209 and/or other container(s) 2212. Also, the data log could be used to keep track of the quantity of raw solutes/solvents/chemicals/slurries used. This information could be used to facilitate order processing of replacement chemicals and supplies.

Although holding tanks and other containers are shown in FIG. 22, the solution could be released as part of a continuous process. For instance, instead of merely filling a discrete number of holding tanks or other containers, the solution could be continuously or nearly-continuously supplied to any receiving vessel, such as a line of waiting trucks or another process that uses the solution being produced.

As noted above, the release of slurry 2206 into another vessel is optional. In some instances, it may be advantageous to operate in a winterization mode. In this mode, the mixer 102 is located outdoors or in a location where it is possible for the ingredients or solution to freeze. The control panel may be located either outdoors or indoors. When in winterization mode, slurry 2206 may be periodically or continuously circulated, even if no solvent or solute is being added. This may help ensure the solution is evenly mixed, help prevent sediment buildup, and help prevent any part of the slurry or solution from freezing. The continuous mixing also allows conductivity to be more accurately measured because the temperature of the solution will be kept more uniform, and conductivity measurements are dependent on both the concentration of the solute and the temperature.

Additives

Figure 23A:
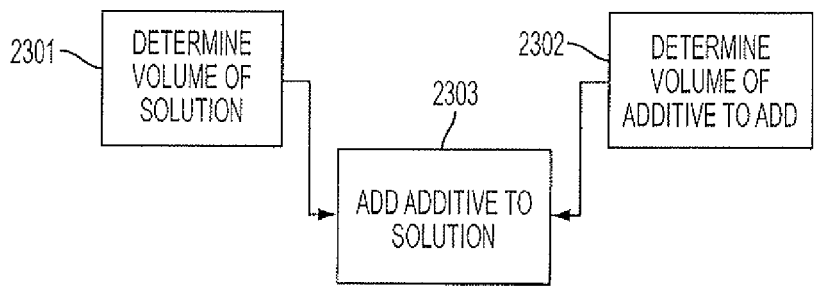
FIGS. 23A-23C show flow charts that illustrate various methods of mixing additives into a slurry in accordance with aspects of the invention.

FIG. 23 illustrates three possible processes for mixing an additive into the solution produced. In FIG. 23A, the volume of the solution is determined in step 2301. From this volume, the volume of the additive needed is calculated in step 2302. Alternatively, the volume of the additive can be determined first, and the required volume of solution could be calculated from the volume of the additive to be used. The solution and additive are combined in step 2303.

Figure 23B:
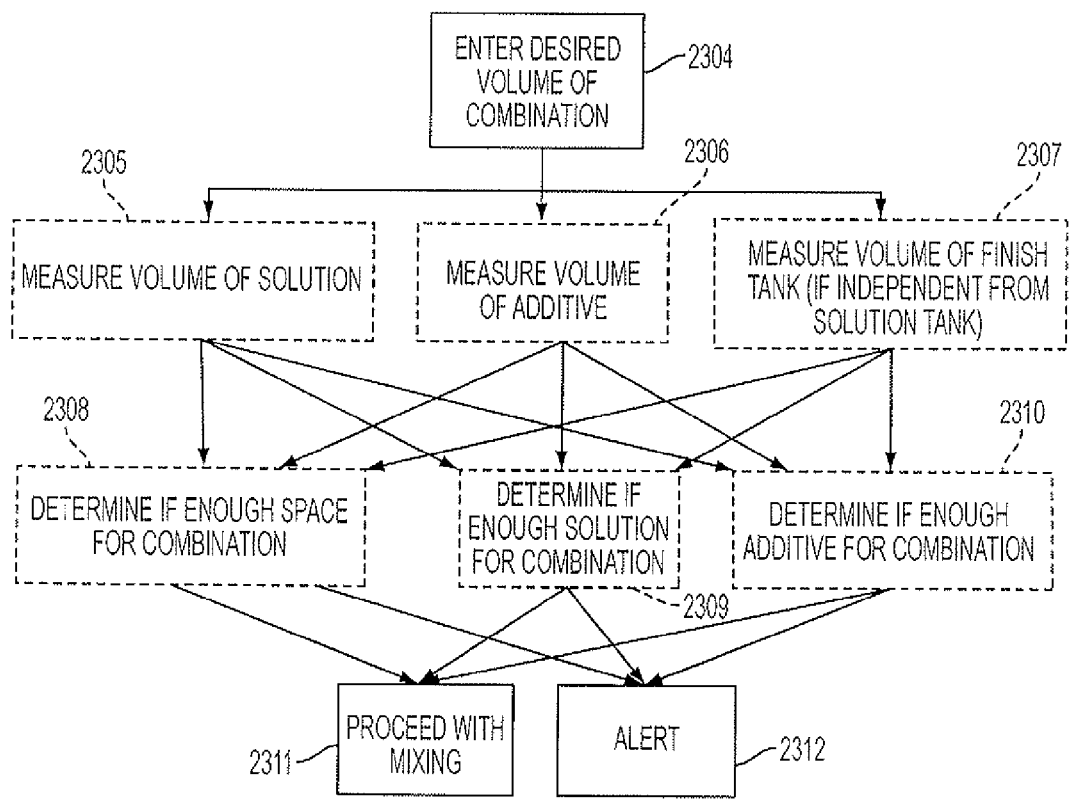

FIG. 23B shows the logic required to automate the mixing of an additive to the solution. First, the total volume (quantity) of the combination of additive and solution is determined in step 2304. This total volume (for example, the quantity) could be, for example, the volume of the container in which the combination will be placed. That container may be the same container the solution or additive is in, or it could be a third container 2307. If the volume desired is greater than the total space available in container 2307 or the container where the combination will be placed, as determined in step 2308, then an alert 2312 will be given. If mixing were to proceed, the container would overflow. Alternatively, the volume of the combination to be produced could be adjusted below the desired volume, and, assuming no other reasons for an alert are present, the process could proceed.

The desired volume of the combination of solution and additive 2304 can be used to calculate the volume of solution needed and the volume of additive needed. If there is not enough of either one, as determined in steps 2309 and 2310, then an alert 2312 must be given. The process could optionally proceed by producing a lesser volume than the desired volume 2304.

Steps 2309 and 2310, which measure the volume of the solution or additive, could be carried out by use of a pressure transducer. The transducer's sensor would be mounted on the bottom of the vessel. The pressure reading would be proportional to the weight of the solution or additive in the column above the transducer's sensor. The volume stored in the vessel could then be calculated using the dimensions of the vessel and the specific gravity of the solution or additive.

Each of steps 2305, 2306, 2307, 2308, 2309, and 2310, which are described above, is optional because any one of steps 2308, 2309, and 2310 is enough to trigger an alert. Alternatively, only some of the above steps may be used in situations where one wants to construct a solution making system using fewer sensors or steps. If an alert is triggered, the process will not be able to produce the desired volume 2304 regardless of the outcome of the other steps. If, on the other hand, there is enough space for the combination, as determined in step 2308, and there is enough solution and additive, as determined in steps 2309 and 2310, then the desired volume of a combination of solution and additive will be produced in step 2311.

Figure 23C:
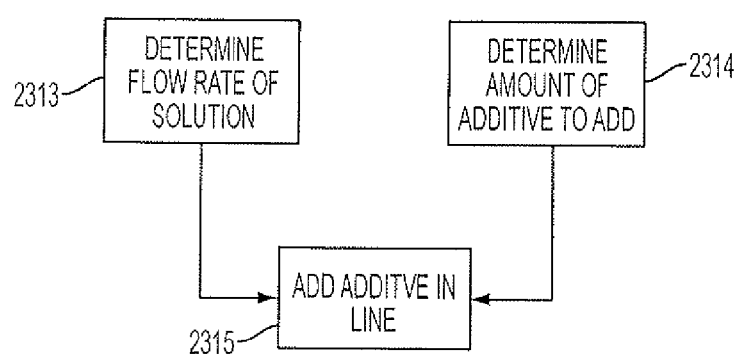

FIG. 23C shows a logic that mixes an additive with a solution in a continuous process. Unlike in FIGS. 23A and 2313, a desired volume is not needed. Instead, the solution is being released without regard to the final amount to be produced. The flow rate of the solution is determined in step 2313. This can be accomplished in many ways. For example, the rate at which the flow of solution turns a turbine could be measured. Another technique would be to determine the flow rate per a time interval. In this example, a valve being open for 15 seconds at a flow rate of 4 gallons per minute would result in 1 gallon being dispensed.

Once the flow rate of the solution is known, the flow rate of the additive needed to create the desired mixture is determined in step 2314. In step 2315, the flow rate of the additive is regulated in accordance with the calculation of step 2314 in order to produce the desired mixture. Alternatively, the flow rate of the additive could be measured, and the flow rate of the solution could be regulated. Or both could be regulated in order to achieve a desired flow rate of the final combination. A proportional-integral-derivative (PID) circuit, which is known in the art, could be used to dynamically calculate the required flow rate of additive, solution, or both, even if the flow rate is not constant.

Dispensing

Figure 24:
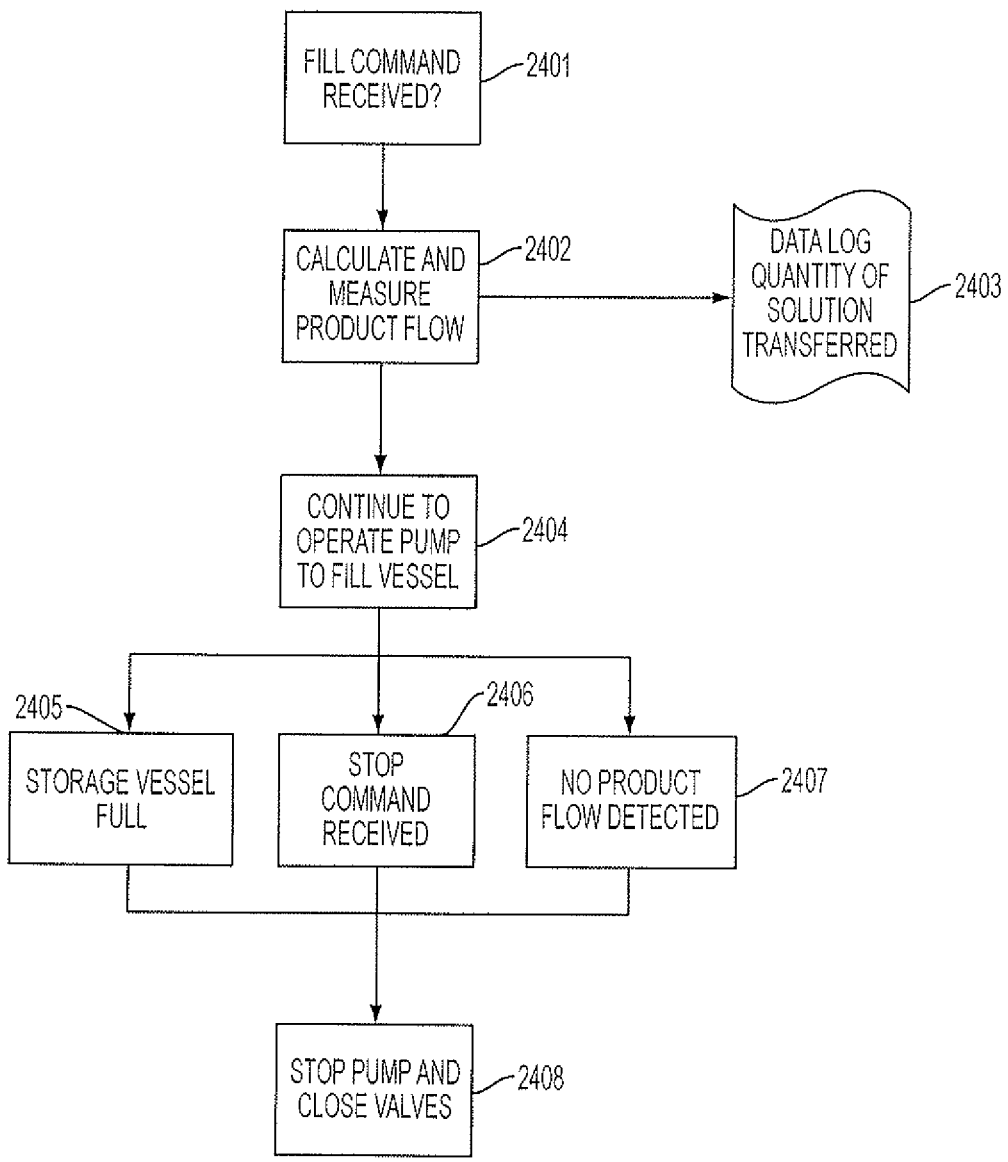
FIG. 24 is a flow chart that illustrates the process of releasing the slurry to another vessel in accordance with aspects of the invention.

FIG. 24 illustrates the control logic for filling a vessel, such as a drum or a truck which has pulled into a filling station, with the solution produced by the solution maker. The vessel may be filled from the tank used to produce the solution, as in step 2208 of FIG. 22, or from a holding tank or other container such as the ones in step 2209 and 2212 of FIG. 22. The product is placed into the vessel in step 2401 once a fill command is received. This could happen once a user presses a button or once a truck to be filled has pulled onto a weight-sensitive loading area. Step 2402 shows the flow of the product being delivered to the vessel being calculated and measured. As described with reference to FIG. 23, the amount of product dispersed, along with any other information about the product that may be useful, can be recorded in a data log in step 2403. For example, if a truck is being filled, the time and amount of product dispersed could be used to send a bill to the truck's owner. The product will flow into the vessel to be filled, as in step 2404, until the storage vessel is full (step 2405), a command to stop pumping the product is received (step 2506), or there is no more product to deliver due to lack of supply or any sort of malfunction (step 2407). Once any of the above events are detected, the pumping stops and the valves are closed (step 2408).

Figure 25A:
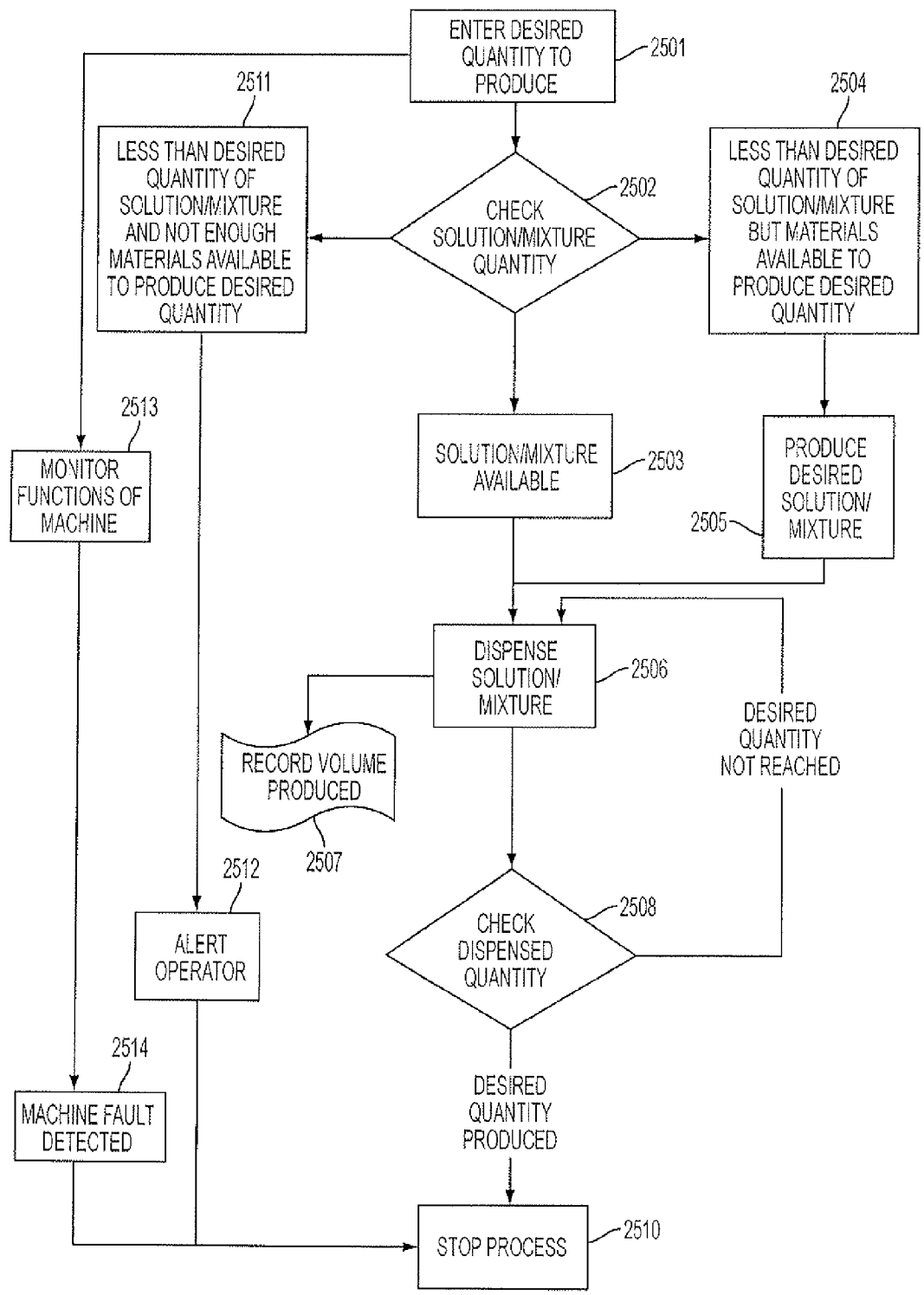
FIGS. 25A-25B show various processes for dispensing at least one of a solution and/or mixture in accordance with aspects of the present invention.

FIG. 25A illustrates the control logic of another aspect of the invention. This control logic could be used to dispense a desired quantity of a solution, a mixture (a solution with additives), or both. In step 2501, a desired quantity of the solution or mixture being produced is determined. The desired quantity could be entered by a human operator, or it could come from an predefined setting, such as a known size of a container to be filled. It could also be determined automatically or be defined by the requirements of a process that ultimately uses the solution or mixture dispensed.

In step 2502, the quantity of solution or mixture that is already available is determined. If this quantity is equal to or greater than the quantity to be dispensed, then the desired quantity 2501 is dispensed in step 2506. The volume (or another indicator of quantity) dispensed in step 2506 is recorded into a log or database in step 2507. This log can be used to keep track of a number of aspects of to the machine's operation and can be used to automate auxiliary tasks, as described above with reference to data log 2211. In step 2508, the quantity dispensed is checked. This could be accomplished by measuring the flow rate, determining the volume of solution or mixture in the vessel into which the solution or mixture is being dispensed (if one exists), determining the volume of solution or mixture in the vessel from which the solution is being dispensed, or any other appropriate method. If the desired quantity has not yet been dispensed, then the dispensing and checking continues. Once the desired quantity has been dispensed, then the process is stopped (step 2510).

When the quantity of solution or mixture available is determined in step 2502, it is possible that there is not enough solution or mixture available to dispense the desired quantity. In this case, more solution should be produced. If the materials are available to produce the required solution or mixture (step 2504), then that solution or mixture will be created in step 2505 and dispensed in step 2506.

If there are not enough materials available to produce the amount of solution or mixture required (step 2511), then an alert is given in step 2512 and the process is stopped (step 2510).

It is possible for steps 2503 (the solution/mixture is available) and 2505 (produce solution/mixture) to occur simultaneously: a reserve quantity of solution or mixture could be maintained. The reserve quantity of the solution or mixture would always either available or in the process of being replenished during normal operation. Operating in this manner could increase efficiency by reducing any delay between entering a desired quantity and having that quantity dispensed. In this case, alert 2512 could be an alert that the desired quantity cannot be dispensed, but it could also be an alert that the desired reserve level of solution cannot be maintained due to lack of materials.

Finally, while any of the steps described above are performed, the machine can monitor its own functions in step 2513 to detect usage of materials as well as abnormal operation. If a fault is detected (step 2514), then the machine could stop dispensing solution to ensure safety and/or accuracy. As a non-limiting example, a fault could include an unexpectedly high or low level of solution or source materials being detected, which would indicate a leak or improper dispensation.

The step of producing a desired solution or mixture for dispensation 2505 could include the entire process indicated in FIG. 25A. This could occur if a desired quantity of a mixture is to be produced in step 2501. The mixture is a combination of an additive and a solution. In step 2505, the mixture would be produced by combining solution and additive. The amount of solution needed to mix with the additive could be viewed as the desired quantity 2501. The process of dispensing the solution could therefore be included within step 2505 of the process of dispensing the mixture.

Figure 25B:
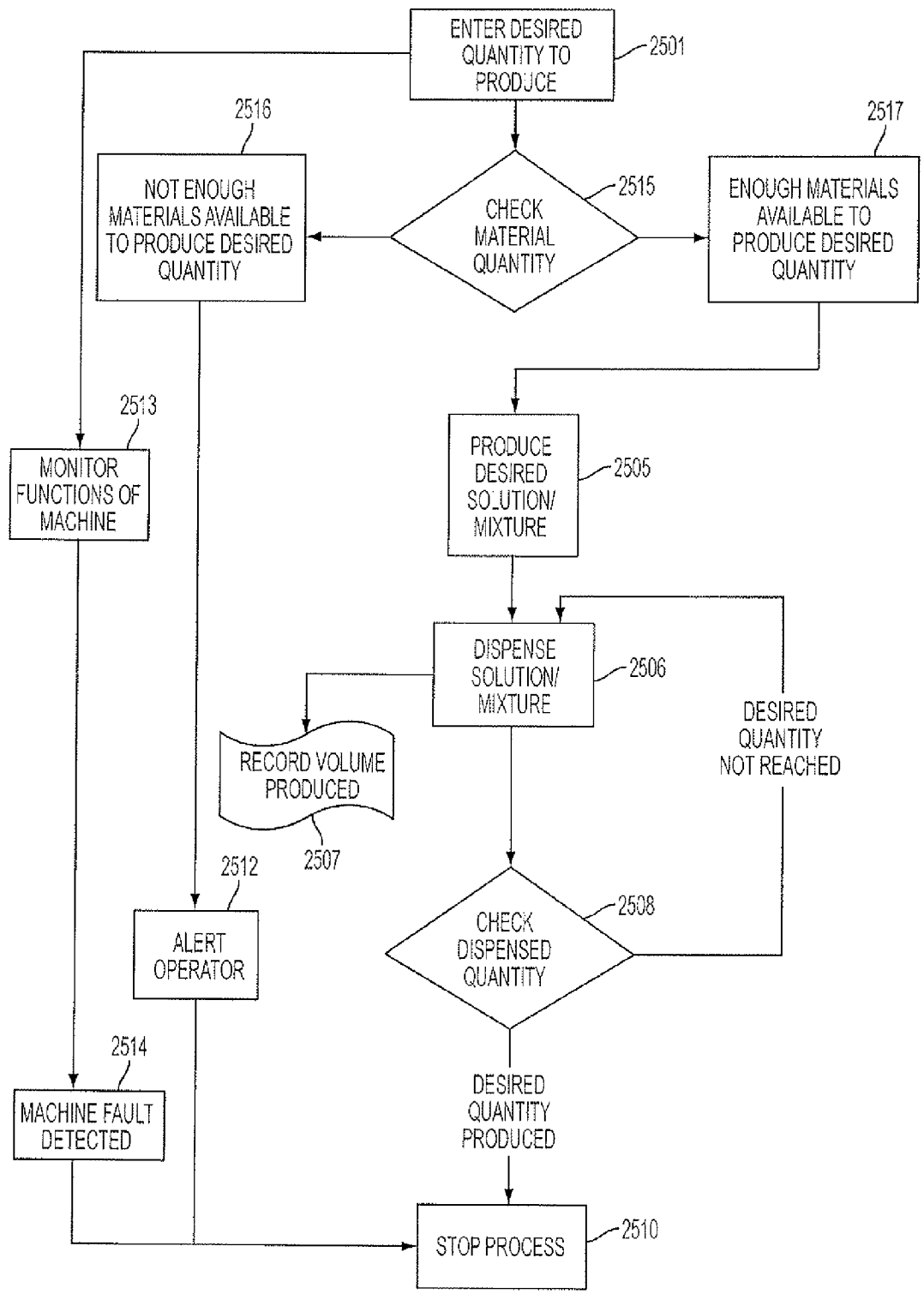

FIG. 25B is similar to FIG. 25A, but it illustrates that having solution or mixture pre-made and available is not necessary and does not have to be provided for. In this aspect of the invention, the quantities of materials needed to make the solution or mixture is checked in step 2515 after the desired quantity is entered (step 2501). If there are enough materials available to produce the desired quantity (step 2517), then that quantity is produced (step 2505) and dispensed (step 2506). If there are not enough materials available (step 2516), then an alert occurs (step 2512) and the process is stopped. The design of FIG. 25B could be advantageous in situations where having the solution or mixture pre-made is more difficult or costly due to, for example, space constraints.

Finally, while the tank of the present invention is used with a control system that regulates the mixing of chemicals, the tank can be used separately from the control system, and the control system can be used separately from the tank or in conjunction with a different tank.

Chemicals, Solutions, and Solvents

Various chemicals, solutions, and solvents may be used and created using aspects of the present invention. Examples include calcium magnesium acetate, calcium chloride, magnesium chloride, potassium acetate, potassium formate, sodium formate, magnesium acetate, diamonium phosphate, monoamonium phosphate, urea, ethyl glycol, propylene glycol, and other chemicals.

Modifications

In various aspects, one or more of the structures, systems, methods, and the like may be used in combination with others. Further, the structure of the solution maker may include additional modifications as follows. First, for example, one or more components of the solution maker may be made of a non-plastic material. For instance, grate 142 may be made of a non-plastic material, at least in part or in its entirety. Similarly, at least one of first container 104 and second container 106 may be constructed at least in part of a non-plastic material. Plastic has a number of advantages over other materials. Nonetheless, plastic materials are not as beneficial as other materials in various situations. For instance, plastic materials can become brittle in cold temperatures or when exposed to various chemicals or ultraviolet light. In this regard, stainless steel, aluminum, or other metals may be beneficial to use in various environments. In one example, stainless steel has the benefit of being highly corrosion resistant where other materials would corrode. Alternatively, rubber may be used in place of plastic materials to enhance the flexibility, resilience, and movement of one or more components of the solution maker 100 and/or associated lines. Further, one may use concrete or other materials as concrete is both durable and cost effective.

Second, the water inlets to the solution maker 100 may be simple inlet valves or may be active devices that shift the solvent feed spray pattern to more completely dissolve the chemicals into solution. For instance, the inlet valves may have rotating spray patterns, oscillating spray patterns, and any other spray pattern that prevents unwanted buildup of the chemical on grate 142. Similarly, the inlet valves for second container 106 may similarly be replaced with one or more valves that change their spray patterns.

Third, the mixer 102 may be eliminated and replaced with flow control and mixing valves that provide a mixing environment so as to allow the various chemicals and solvents to be mixed without the need of a mixing tank.

Figure 26:
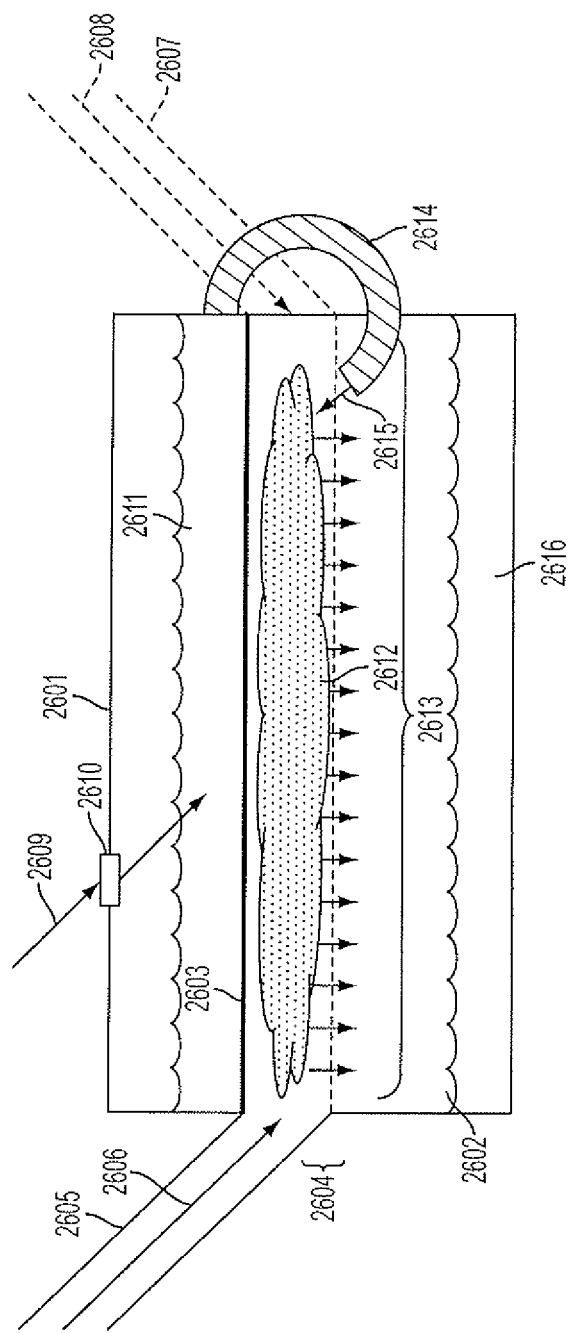
FIG. 26 shows an alternative solution maker in accordance with aspects of the present invention.

Fourth, the solution maker 100 may include a modified structure as shown in FIG. 26. FIG. 26 shows a first portion 2601 and a second portion 2602. Instead of a permeable grate, the bottom of first portion 2601 is an impermeable layer 2603. A solvent 2609 enters first portion 2601 through port 2610. Solvent 2611 next fills portion 2601 as shown as volume 2611. It is appreciated that port 2610 may be located on any side (including the top and bottom walls) of portion 2601.

The top of portion 2602 is a permeable grate 2604. A chemical to be dissolved in solvent 2609 may be added through one or more sides (or even a top conduit, not shown) via pathways 2605 and optionally 2607 in the direction of arrows 2606 and 2608. The chemical to be dissolved accumulates on grate 2604 as show as chemical 2612. The solvent 2611 next follows conduit 2614 from first portion 2601 into 2602. The solvent 2611 is next directed up through grate 2604 or may be sprayed directly between grate 2604 and impermeable layer 2603. As chemical 2612 dissolves into solvent 2611, the mixture passes through grate 2604 as shown by solution 2616. The solution 2616 may then be further processed as describe herein.

It is appreciated that chemical 2612 may be a solid material, a liquid, or a slurry. For instance, the chemical 2612 may be a salt, a salt solution, or a liquid chemical (such as ethylene glycol or a fertilizer) that is mixed with a solvent 2611 such as water or other compound into which the chemical 2612 dissolves.

Figure 27:
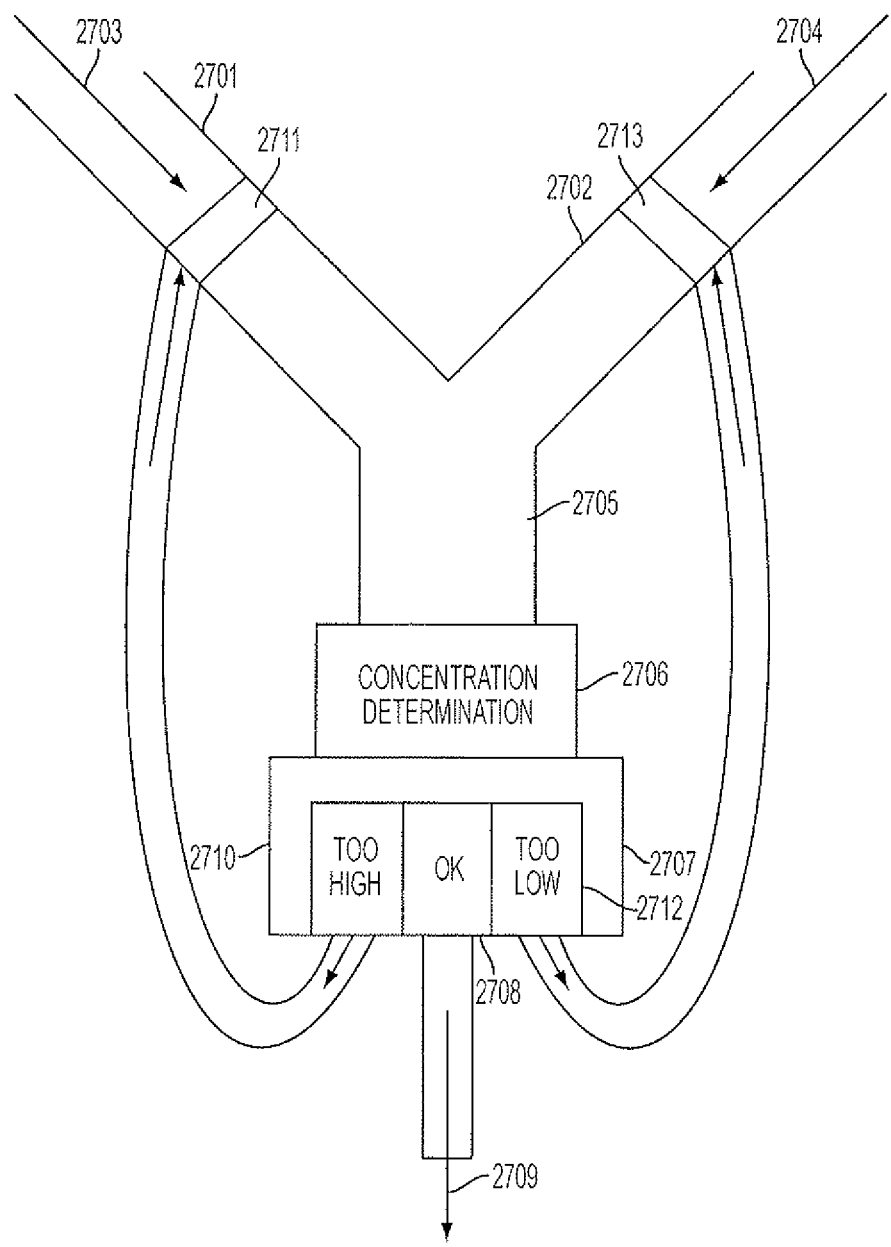
FIG. 27 shows another alternative solution maker in accordance with aspects of the present invention.

Fifth, a further aspect of the mixing system 102 may be modified such that no holding tank exists. FIG. 27 shows a mixing system 102 that lacks a holding tank. A first supply line 2701 provides a concentrated solution 2703. A second supply line 2702 provides a solvent 2704. The concentrated solution 2703 and solvent 2704 are mixed at location 2705. A concentration determination is made at location 2706. The result of the concentration determination 2706 controls diverter 2707 such that mixed solutions of a desired concentration are fed through diverter port 2708 and output at 2709. Concentrations that are too high are fed through diverter port 2710 and output back to the concentrated supply 2703 using optional control valve 2711. Concentrations that are too low are fed through diverter port 2712 and output back to the concentrated supply 2704 using optional control valve 2713. When a mixture has a concentration that is too high, feeding the mixture to the concentrated solution 2703 reduces the concentration of the mixture at point 2705 because of the previously added solvent. The result is a decrease in the concentration at point 2705. Similarly, when a mixture has a concentration that is too low, feeding the mixture to the solvent 2704 increases the concentration of the mixture at point 2705 because of the previously added concentrate 2703. The result is an increase in the concentration of the mixture at point 2705.

Embodiments and Applications

Aspects of the invention may be used in a variety of applications as separated into the following embodiments.

In a first embodiment, aspects of the invention may be used in a corrosive environment such as mixing brine for deicing applications. Brine used for deicing is very corrosive. Minimizing the number of delicate instruments that contact the brine is important. For instance, adding a spinning flow meter in the solution may create severe maintenance problems due to continuous failure of the flow meter. While one may use a flow meter for this caustic environment, the cost of the flow meter may be high, thereby making the entire solution maker more expensive. One benefit of using this type of flow meter, however, is that it can provide highly accurate measurements of material flowing past it.

In a second embodiment, aspects of the invention may be used in other brining industries that have less caustic environments. For instance, aspects of the invention may be used in the cheese, beverage, or meat processing industries. Here, the food may be dipped in a brine solution that has a lower salt level than that of the deicing environment.

In a third embodiment, aspects of the invention may be used in industrial water supply environments in which large supplies of water or other liquid chemicals need to be mixed before being provided for subsequent processing or use. For example, hospitals, processing plants, energy generation plants and the like may require large amounts of treated water or other materials. Aspects of the present invention may be used to help mix solutions for these applications.

In a fourth embodiment, aspects of the present invention may be used to mix other chemicals or slurries including but not limited to various oils, solutions used in water cutting or sand blasting, the production of blended fertilizers, and milling and the like.

Although the present invention has been described with reference to embodiments, persons skilled in the art will recognize that changes may be made in form and detail without departing from the spirit and scope of the invention.

The invention claimed is:

1. A solution making apparatus that combines a solvent and a chemical comprising:
    a first container that receives said solvent;
    a second container that receives a solution of said solvent and said chemical;
    a third location that receives a solution of said solvent and said chemical;
    a concentration sensor that outputs a signal;
    a first processor that determines a concentration of said solution based on said signal;
    a first return conduit that returns said solution from said second container to said first container when a concentration of said solution is below a desired concentration;
    a second return conduit that returns said solution from said second container to said third location when a concentration of said solution is above a desired concentration, said second return conduit including an inlet through which additional solvent is added to said solution;
    an outlet conduit that outputs said solution having said desired concentration;
    an additive container holding an additive;
    a mixing location at which said additive is mixed with said solution, wherein the mixing location is selected from the group consisting of the additive container, a third container, and a conduit;
    a controller that determines if said additive and said solution can be mixed to one of a desired concentration and desired volume and controls a mixing of said additive and said solution to create at least one of said desired concentration and said desired volume, wherein the controller is selected from the group consisting of the first processor and a second processor;
    wherein said third location is selected from the group consisting of the first container and the outlet conduit.

2. The solution making apparatus according to claim 1, further comprising:
    a sensor associated with said additive container, said sensor outputting a signal;
    wherein said controller uses said signal to determine a volume of additive in said additive container.

3. The solution making apparatus according to claim 1, further comprising:
    a sensor associated with a solution container holding said solution, said sensor outputting a signal;
    wherein said controller uses said signal to determine a volume of solution in said solution container.

4. The solution making apparatus according to claim 1, further comprising:
    a sensor associated with an output container, said sensor outputting a signal;
    wherein said controller uses said signal to determine an available volume in said output container to hold the output mixture of said solution and said additive.

5. The solution making apparatus according to claim 1, further comprising:
    a sensor that outputs a signal to said processor,
    wherein said controller uses said signal to determine whether said additive and said solution can be mixed to one of a desired concentration and desired volume and controls a mixing of said additive and said solution to create at least one of said desired concentration and said desired volume.

6. The solution making apparatus according to claim 1, wherein said concentration sensor is a conductivity sensor.

7. The solution making apparatus according to claim 1, wherein said concentration sensor is a specific gravity sensor.

8. The solution making apparatus according to claim 1, wherein said concentration sensor is a refractometer sensor.

9. The solution making apparatus according to claim 1, further comprising an opening at said first container that receives said chemical.

10. The solution making apparatus according to claim 1, further comprising a sump outlet located at the bottom of the second container.

* * * * *